(12) United States Patent
Livengood et al.

(10) Patent No.: US 11,461,490 B1
(45) Date of Patent: Oct. 4, 2022

(54) SYSTEMS, METHODS, AND DEVICES FOR CONDITIONALLY ALLOWING PROCESSES TO ALTER DATA ON A STORAGE DEVICE

(71) Applicant: CRU Data Security Group, LLC, Vancouver, WA (US)

(72) Inventors: William Livengood, Andover, KS (US); William M. Head, II, Bel Aire, KS (US); Dean L. Mehler, Bel Aire, KS (US)

(73) Assignee: CRU Data Security Group, LLC, Vancouver, WA (US)

( * ) Notice: Subject to any disclaimer, the term of this patent is extended or adjusted under 35 U.S.C. 154(b) by 100 days.

(21) Appl. No.: 17/030,119

(22) Filed: Sep. 23, 2020

(51) Int. Cl.
*G06F 3/06* (2006.01)
*G06F 21/62* (2013.01)
*G06F 21/56* (2013.01)

(52) U.S. Cl.
CPC ........ *G06F 21/6218* (2013.01); *G06F 3/0622* (2013.01); *G06F 3/0655* (2013.01);
(Continued)

(58) Field of Classification Search
CPC .... G06F 3/0622; G06F 3/0631; G06F 3/0634; G06F 3/0655; G06F 3/0676;
(Continued)

(56) References Cited

U.S. PATENT DOCUMENTS 5,825,715 A 10/1998 Rezeanu
6,032,237 A 2/2000 Inoue et al.
(Continued)

FOREIGN PATENT DOCUMENTS

JP 2012530967 A 12/2012
KR 20160138450 A 12/2016

OTHER PUBLICATIONS

CRU Data Security Group, LLC, "USB WriteBlocker User Manual" product user manual, made available on the company website www.cru-inc.com on Apr. 13, 2011, 8 pages, CRU Data Security Group, LLC (formerly CRU Acquisition Group, LLC).
(Continued)

*Primary Examiner* — Gary J Portka
(74) *Attorney, Agent, or Firm* — Kolisch Hartwell, P.C.

(57) ABSTRACT

A combination default write-blocking system may include a host computer. The host computer may include at least one general storage device storing program instructions for a blocking driver assembly and a host processor configured as the blocking driver assembly while executing the program instructions for the blocking driver assembly. A connection interface device physically separate from the host processor, and the connection interface device is configured to be operatively coupled to the host processor and to a protected storage device physically separate from the general storage device, receive a communication from the blocking driver assembly, and establish communication between the protected storage device and the host processor after receiving the communication from the blocking driver assembly. The blocking driver assembly is further configured to communicate with the connection interface device and conditionally allow a host computer process to alter data stored on the protected storage device.

25 Claims, 13 Drawing Sheets

(52) U.S. Cl.
CPC .......... *G06F 3/0676* (2013.01); *G06F 3/0677* (2013.01); *G06F 3/0679* (2013.01); *G06F 21/56* (2013.01)

(58) Field of Classification Search
CPC ...... G06F 3/0677; G06F 3/0679; G06F 21/56; G06F 21/6218
USPC .................. 711/152, 163; 726/17, 19, 29
See application file for complete search history.

(56) References Cited

U.S. PATENT DOCUMENTS

| | | | |
|---|---|---|---|
| 6,041,394 A | 3/2000 | Halligan et al. | |
| 6,397,310 B1 | 5/2002 | Adolph et al. | |
| 6,629,184 B1 | 9/2003 | Berg et al. | |
| 6,651,150 B2 | 11/2003 | Maeda | |
| 6,687,858 B1 | 2/2004 | Adams | |
| 6,760,807 B2 | 7/2004 | Brant et al. | |
| 6,813,682 B2 | 11/2004 | Bress et al. | |
| 6,907,512 B2 | 6/2005 | Hill et al. | |
| 7,069,475 B2 | 6/2006 | Adams | |
| 7,290,115 B2 | 10/2007 | Hill et al. | |
| 7,318,137 B2 | 1/2008 | Bress et al. | |
| 7,440,886 B2 | 10/2008 | Bress et al. | |
| 7,478,207 B2 | 1/2009 | Nogami | |
| 7,523,281 B2 | 4/2009 | Madathilparambil George et al. | |
| 7,640,404 B2 | 12/2009 | Macintyre et al. | |
| 7,809,686 B2 | 10/2010 | McCreight et al. | |
| 8,037,361 B2 | 10/2011 | Bish et al. | |
| 8,082,585 B1 | 12/2011 | Givonetti | |
| 8,161,537 B2 | 4/2012 | Gill et al. | |
| 8,166,314 B1 | 4/2012 | Raizen et al. | |
| 8,234,477 B2 | 7/2012 | Shaath | |
| 8,311,990 B2 | 11/2012 | Martinek et al. | |
| 8,474,032 B2 | 6/2013 | Fetik | |
| 8,539,245 B2 | 9/2013 | Swanson et al. | |
| 8,656,095 B2 | 2/2014 | Coulter | |
| 8,656,487 B2 | 2/2014 | Rothman et al. | |
| 8,793,795 B1 | 7/2014 | Ravid | |
| 10,430,361 B1 | 10/2019 | Wiebe et al. | |
| 10,769,089 B1 | 9/2020 | Wiebe et al. | |
| 2006/0288180 A1* | 12/2006 | Shih ..................... | G06F 21/79 711/163 |
| 2008/0295174 A1 | 11/2008 | Fahmy et al. | |
| 2014/0196004 A1 | 7/2014 | Weinsberg et al. | |
| 2014/0244522 A1 | 8/2014 | McCreight | |
| 2014/0281320 A1 | 9/2014 | Sun | |
| 2015/0003155 A1 | 1/2015 | Jaskowiak et al. | |
| 2015/0347050 A1* | 12/2015 | Xie ..................... | G06F 3/0644 711/163 |
| 2016/0070656 A1* | 3/2016 | Babu ..................... | G06F 3/0619 711/163 |
| 2017/0244729 A1 | 8/2017 | Fahrny et al. | |

OTHER PUBLICATIONS

Tableau; Tableau Storage Manager (TSW-TSM); Product Overview; Downloaded from the Internet at URL https://www.guidancesoftware.com/products/Pages/tableau/products/software/tableau-storage-manager.aspx# on Apr. 9, 2015; 2 pages.

CRU Data Security Group, LLC, "CRU WiebeTech USB 3.0 Write Blocker Quick Start Guide" product instruction manual, made available on the company website www.cru-inc.com on or before Dec. 31, 2015, 2 pages, CRU Data Security Group, LLC (formerly CRU Acquisition Group, LLC).

CRU Data Security Group, LLC, "WiebeTech USB 3.1 WriteBlocker Quick Start Guide" product user manual, made available on the company website www.cru-inc.com on Aug. 31, 2018, 8 pages, CRU Data Security Group, LLC (formerly CRU Acquisition Group, LLC).

CRU Data Security Group, LLC, "USB 3.0 WriteBlocker" product advertising flyer, made available on the company website www.cru-inc.com on Dec. 31, 2018, 2 pages, CRU Data Security Group, LLC (formerly CRU Acquisition Group, LLC).

CRU Data Security Group, LLC, "USB 3.1 WriteBlocker" product advertising flyer, made available on the company website www.cru-inc.com on or before Dec. 31, 2018, 2 pages, CRU Data Security Group, LLC (formerly CRU Acquisition Group, LLC).

U.S. Patent and Trademark Office, Non-Final Office Action regarding U.S. Appl. No. 15/383,750, dated Jan. 28, 2019, 14 pages.

Anderson, Edward B., Statement by attorney for applicant regarding prior sales and description of products offered for sale by applicant, CRU Data Security Group, LLC (formerly CRU Acquisition Group, LLC), on the company website www.cru-inc.com on or before Apr. 4, 2019, 7 pages, document prepared Sep. 23, 2020.

CRU Data Security Group, LLC, "WiebeTech Product Page" retrieved from Web.Archive.Org on Sep. 17, 2020, made available on the company website www.cru-inc.com on or before Apr. 4, 2019, 3 pages, CRU Data Security Group, LLC (formerly CRU Acquisition Group, LLC).

U.S. Patent and Trademark Office, Non-Final Office Action regarding U.S. Appl. No. 16/586,533, dated Apr. 16, 2020, 15 pages.

* cited by examiner

SYSTEMS, METHODS, AND DEVICES FOR CONDITIONALLY ALLOWING PROCESSES TO ALTER DATA ON A STORAGE DEVICE

TECHNOLOGICAL FIELD

The present disclosure generally relates to computer data storage systems. More specifically, the disclosed embodiments relate to systems, methods, apparatus, and articles of manufacture for conditionally allowing a host computer process to alter data stored on a protected storage device.

INTRODUCTION

A general purpose computer stores a plurality of host computer processes (i.e. executable software applications) and information corresponding to the plurality of host computer processes. Currently, these general purpose computers, or "host" computers are prone to ransomware attack. Generally, when the ransomware attacks the "host" (also referred to as host computer hereinafter), a ransom virus (such as a malicious software code) enters the "host" computer and starts encrypting all local and network drive files that the ransom virus finds. These files may also include boot driver files such as files on a local-C drive where sensitive information of host computer processes is stored. Further, the ransom virus saves the encrypted files in place of the original files and deletes the original files. The encrypted files can be accessed only with a decryption key, which will not be known to the user. In some scenarios, once files are encrypted, the virus will display a message demanding money for the decryption key. This in turn poses a serious threat to integrity and validity of data stored in the host computer.

One solution to mitigate the aforesaid problem of ransomware attack is to maintain offline "backups" of files of the host computer, that is to say, backups that are not available even to a host processor on the host computer. This may be done by maintaining up-to-date files associated with the host computer's processes as backup in a remote database, often referred to as the "cloud" via a network, such as the Internet. However, in some scenarios, the cloud may also be prone to ransomware attack, such as when the backup cloud is mapped on the host computer. Further, automating backups that can be easily taken offline can be challenging, especially for small businesses and home users.

A write-blocker may be a software process which permits read-only access to data storage devices connected to the host computer. In some cases, the write-blocker may also be in the form of a physical device (hardware) connected between the host computer and a suspected storage drive. The primary purpose of a write-blocker is to intercept and prevent (or 'block') a modifying command operation from reaching the storage drive.

SUMMARY

Write blocking systems are disclosed that have a default functionality of blocking commands that would alter data on a protected storage device while conditionally allowing a process to alter data stored on the protected storage device.

In some embodiments, a combination default write-blocking system includes a host computer including at least one general storage device and a host processor. The at least one general storage device is configured to store program instructions for a blocking driver assembly. The host processor is operatively coupled to the at least one general storage device and is configured as the blocking driver assembly while executing the program instructions for the blocking driver assembly. The combination default write blocking system further includes a connection interface device, which is physically separate from the host processor and is configured to be operatively coupled to the host processor and to a protected storage device. The protected storage device is physically separate from the at least one general storage device. The connection interface device is configured to receive a communication from the blocking driver assembly and further to establish communication between the protected storage device and the host processor after receiving the communication from the blocking driver assembly. The blocking driver assembly is configured to communicate with the connection interface device and further to conditionally allow a host computer process to alter data stored on the protected storage device.

In some embodiments, the at least one general storage device is configured to store at least one authorized identifier associated with at least one authorized host computer process authorized to alter data stored on the protected storage device. Further, the blocking driver assembly is configured to allow the at least one authorized host computer process to alter data stored on the protected storage device based on the at least one authorized identifier; and prevent a host computer process not associated with an authorized identifier, including the at least one authorized identifier, from altering data stored on the connected protected storage device In some embodiments, the blocking driver assembly includes a high-level driver and a low-level driver. The high-level driver is configured to associate a command with a host computer process that issued the command and further to determine if the associated host computer process is associated with the authorized identifier. The low-level driver is configured to establish communication with the connection interface device before establishing communication between the protected storage device and the host processor and further to communicate the command with the protected storage device when the associated host computer process is associated with the at least one authorized identifier.

In some embodiments, the high-level driver is configured to add a tag to the command indicating whether the host computer process is associated with the authorized identifier, and the low-level driver is configured to block or pass the command, based on the tag added to the command.

In some embodiments, the high-level driver is configured to block the command if the associated host computer process is not associated with the authorized identifier.

In some embodiments, the low-level driver is configured to allow the command having the tag indicating that the associated host computer process has the authorized identifier.

In some embodiments, the low-level driver is configured to block the command not having the tag indicating that the associated host computer process is associated with the at least one authorized identifier.

In some embodiments, the high-level driver is configured to block the command from being communicated to the low-level driver if the command is from a host computer process not associated with the at least one authorized identifier.

In some embodiments, the program instructions for the blocking driver assembly includes instructions for a supplemental process configured to access authorization information identifying one or more than one authorized host computer process, including the at least one authorized host computer process, authorized to alter data stored on the protected storage device; generate, from the accessed authorization information, a first list of one or more than one process-related identifier, wherein each of the one or more process-related identifier is associated with one or more of the identified authorized host computer process; and store, on the at least one general storage device, the first list of the one or more process-related identifier and associated one or more of the identified authorized host computer process.

In some embodiments, the supplemental process is configured to store, on the at least one general storage device, a second list of each of the one or more authorized identifier for which the associated one or more authorized host computer process is currently active.

In some embodiments, the supplemental process is configured to monitor each of the one or more authorized host computer process that is currently active; and remove from the second list the authorized identifier of the one or more authorized identifier when the associated one of the one or more associated authorized host computer process becomes inactive.

In some embodiments, the supplemental process is configured to determine when no authorized host computer process is active; and send to the connection interface device an instruction to disconnect the protected storage device when no authorized host computer process is active.

In some embodiments, the program instructions for the blocking driver assembly include instructions for at least a first driver for driving the protected storage device. The supplemental process is configured to send to the first driver the second list, and the first driver is configured to determine if an associated host computer process that issued a command received by the first driver is associated with an authorized identifier on the second list.

In some embodiments, the first driver is configured, when the first driver determines the associated host computer process that issued the command is not associated with an authorized identifier on the second list, to send a communication to the supplemental process inquiring as to whether the associated host computer process that issued the received command is an authorized host computer process; receive a response from the supplemental process indicating whether or not the associated host computer process that issued the received command is associated with a process-related identifier on the first list and has an associated authorized identifier; and add the associated authorized identifier to the second list if the associated host computer process that issued the received command is associated with a process-related identifier on the first list.

In some embodiments, if the supplemental process notifies the first driver that the command is from a host computer process that is not associated with a process-related identifier on the first list, the first driver adds an unauthorized identifier to a third list of unauthorized identifiers associated with unauthorized host computer processes.

In some embodiments, if the host computer process that issued the received command is not associated with an authorized identifier on the second list, and prior to sending the inquiry to the supplemental process asking if the host computer process that issued the received command is associated with a process-related identifier on the first list, the first driver determines if the host computer process that issued the received command is associated with an unauthorized identifier on the third list.

In some embodiments, the first driver is a high-level driver. The program instructions for the blocking driver assembly include instructions for a low-level driver. The supplemental process is configured to send to the low-level driver the second list, and the low-level driver is configured to receive the second list from the supplemental process.

In some embodiments, the low-level driver is configured to receive a command issued by a host computer process and determine if the host computer process that issued the received command is associated with an authorized identifier on the second list.

In some embodiments, the supplemental process is configured to communicate with the connection interface device; and the connection interface device is configured to communicate with the supplemental process, and establish communication between the protected storage device and the host computer only after communication with both the blocking driver assembly and the supplemental process.

In some embodiments, the at least one general storage device is further configured to store an authorized identifier associated with an associated plurality of authorized host computer processes authorized to alter data stored on the protected storage device, including the at least one authorized host computer process. The blocking driver assembly is configured to block each of the associated plurality of authorized host computer processes from altering data stored on the connected protected storage device when at least one of the associated plurality of authorized host computer processes is inactive.

In some embodiments, the supplemental process is configured to store on the at least one general storage device an indication of the authorized identifier for which each of the associated plurality of authorized host computer processes are currently active; monitor the associated plurality of authorized host computer processes; and remove the indication of the authorized identifier when at least one of the associated plurality of authorized host computer processes becomes inactive.

In some embodiments, the at least one general storage device is configured to store instructions for a supplemental process configured to monitor the high-level driver and the low-level driver; and send to the connection interface device an instruction to disconnect the protected storage device when either one of the high-level driver and the low-level driver ceases to be active.

In some embodiments, the at least one general storage device is configured to store an authorized identifier for each of an associated plurality of authorized host computer processes authorized to alter data stored on the protected storage device, including the authorized host computer process. The blocking driver assembly is configured to block each of the associated plurality of authorized host computer processes from altering data stored on the connected protected storage device when at least one of the associated plurality of authorized host computer processes becomes inactive.

In some embodiments, the at least one general storage device is configured to store instructions for a supplemental process configured to store, on the at least one general storage device when the associated plurality of authorized host computer processes are currently active on the host computer, an indication that the associated plurality of authorized host computer processes associated with the authorized identifier are currently active; monitor an activity of each of the associated plurality of authorized host computer processes; and remove the indication when at least one of the associated plurality of authorized host computer processes becomes inactive.

In some embodiments, the blocking driver assembly is configured to monitor an activity of each of the at least one authorized host computer process, and send to the connection interface device an instruction to connect the protected storage device to the host computer when at least one authorized host computer process becomes active; and the connection interface device is further configured to connect the protected storage device to the host processor only after the connection interface device receives the instruction from the blocking driver assembly to connect the protected storage device to the host processor when at least one authorized host computer process becomes active.

In some embodiments, a method of combination default write-blocking includes executing program instructions for a blocking driver assembly by a host processor of a host computer; sending a communication from the blocking driver assembly to a connection interface device that is physically separate from the host processor and operatively coupled to the host computer and to a protected storage device; receiving, by the connection interface device, the communication sent from the blocking driver assembly; establishing, by the connection interface device, communication between the protected storage device and the host processor after receiving the communication sent from the blocking driver assembly; and conditionally allowing by the blocking driver assembly a host computer process to alter data stored on the protected storage device.

In some embodiments, the condition is the existence of an authorized identifier associated with an authorized host computer process authorized to alter data stored on the protected storage device. The method comprises storing on at least one general storage device of the host computer at least one authorized identifier in association with at least one associated authorized host computer process, and conditionally allowing the host computer process to alter data stored on the protected storage device includes allowing by the blocking driver assembly the at least one authorized host computer process to alter data stored on the protected storage device, based on the stored at least one associated authorized identifier; and preventing by the blocking driver assembly a host computer process not associated with the stored at least one associated authorized identifier from altering data stored on the protected storage device.

In some embodiments, the host processor executing the program instructions for the blocking driver assembly includes executing program instructions for a high-level driver and instructions for a low-level driver, and the method further comprises establishing by the low-level driver the communication with the connection interface device before establishing by the connection interface device the communication between the connected protected storage device and the host processor; associating by the high-level driver a command with an associated host computer process that issued the command; determining by the high-level driver if the associated host computer process is associated with one of the at least one authorized identifier; and communicating by the low-level driver the command with the connected protected storage device when the associated host computer process is associated with the at least one authorized identifier.

In some embodiments, the method comprises adding by the high-level driver a tag to the command indicating whether the associated host computer process is associated with the at least one authorized identifier; and blocking or passing the command, by the low-level driver, based on the tag added to the command.

In some embodiments, the method comprises blocking by the high-level driver the command from the associated host computer process not associated with the associated authorized identifier if the command would alter data stored on the protected storage device.

In some embodiments, the method comprises allowing the command having the tag indicating that the associated host computer process has an authorized identifier to be communicated to the protected storage device.

In some embodiments, the method comprises blocking the command not having the tag indicating that the associated host computer process is associated with one of the at least one authorized identifier if the command would alter data stored on the protected storage device.

In some embodiments, the method comprises blocking by the high-level driver the command from being communicated to the low-level driver if the command is from the associated host computer process not associated with one of the at least one authorized identifier.

In some embodiments, the method comprises accessing, by a supplemental process executing on the host computer, authorization information identifying one or more authorized host computer process, including the at least one authorized host computer process, authorized to alter data stored on the protected storage device; generating, by the supplemental process from the accessed authorization information, a first list of one or more process-related identifier, wherein each of the one or more process-related identifier is associated with one or more of the identified authorized host computer process; and storing, on the at least one general storage device, the first list of the one or more process-related identifier and associated one or more of the identified authorized host computer process.

In some embodiments, the method comprises storing, on the at least one general storage device by the supplemental process, a second list of each of the one or more authorized identifier for which the associated one or more authorized host computer process is currently active.

In some embodiments, the method comprises monitoring by the supplemental process each of the one or more authorized host computer process that is currently active; and removing from the second list by the supplemental process the authorized identifier of the one or more authorized identifier when the associated one of the one or more associated authorized host computer process becomes inactive.

In some embodiments, the method comprises determining by the supplemental process when no authorized host computer process is active, and sending by the supplemental process to the connection interface device an instruction to disconnect the protected storage device when no authorized host computer process is active.

In some embodiments, the host processor executing the program instructions for the blocking driver assembly includes executing program instructions for at least a first driver. The method comprises sending by the supplemental process to the first driver the second list, and determining by the first driver if an associated host computer process that issued a command received by the first driver is associated with an authorized identifier on the second list.

In some embodiments, the method comprises sending by the first driver a communication to the supplemental process inquiring as to whether the associated host computer process that issued the received command has an associated process-related identifier on the first list when the host computer process that issued the received command is not associated with an authorized identifier on the second list; receiving by the first driver a response from the supplemental process indicating whether or not the host computer process that issued the received command is associated with a process-related identifier on the first list; and adding by the first driver an authorized identifier associated with the host computer process that issued the received command to the second list if the associated host computer process that issued the received command is associated with a process-related identifier on the first list.

In some embodiments, the method comprises if the supplemental process notifies the first driver that the command is from a host computer process that is not associated with a process-related identifier on the first list, adding by the first driver an unauthorized identifier associated with the host computer process that issued the received command to a third list of unauthorized identifiers associated with unauthorized host computer processes.

In some embodiments, the method comprises if the host computer process that issued the received command is not associated with an authorized identifier on the second list, and prior to sending the inquiry to the supplemental process asking if the host computer process that issued the received command is associated with a process-related identifier on the first list, determining by the first driver if the host computer process that issued the received command is associated with an unauthorized identifier on the third list.

In some embodiments, the first driver is a high-level driver. The host processor executing program instructions for at least a first driver includes executing program instructions for a low-level driver. The method comprises sending by the supplemental process to the low-level driver the second list and receiving by the low-level driver the second list from the supplemental process.

In some embodiments, the method comprises receiving by the low-level driver a command issued by a host computer process, and determining by the low-level driver if the host computer process that issued the received command is associated with an authorized identifier that is on the second list.

In some embodiments, the method comprises communicating by the supplemental process with the connection interface device; communicating by the connection interface device with the supplemental process; and establishing by the connection interface device communication between the protected storage device and the host computer only after communication between the connection interface device and both the blocking driver assembly and the supplemental process.

In some embodiments, the at least one general storage device stores the authorized identifier for each of an associated plurality of authorized host computer processes authorized to alter data stored on the protected storage device, including the at least one authorized host computer process. The method comprises blocking by the blocking driver assembly each of the associated plurality of authorized host computer processes from altering data stored on the connected protected storage device when at least one of the associated plurality of authorized host computer processes is inactive.

In some embodiments, the method comprises storing, by the supplemental process on the at least one general storage device, an indication of the authorized identifier for which each of the plurality of authorized host computer processes are currently active; monitoring by the supplemental process the activity of each of the associated plurality of authorized host computer processes; and removing by the supplemental process the indication of the authorized identifier when at least one of the associated plurality of authorized host computer processes becomes inactive.

In some embodiments, the method comprises monitoring, by a supplemental process executing on the host computer, the high-level driver and the low-level driver; and sending by the supplemental process to the connection interface device an instruction to disconnect the protected storage device, when either one of the high-level driver and the low-level driver ceases to be active.

In some embodiments, the method comprises storing on the at least one general storage device an authorized identifier for each of an associated plurality of authorized host computer processes authorized to alter data stored on the protected storage device, including the authorized host computer process; and blocking by the blocking driver assembly each of the associated plurality of authorized host computer processes from altering data stored on the connected protected storage device when at least one of the associated plurality of authorized host computer processes is inactive.

In some embodiments, the method comprises storing, by the supplemental process on the at least one general storage device when the associated plurality of host computer processes are currently active on the host computer, an indication that the associated plurality of authorized host computer processes associated with the associated authorized identifier are currently active; monitoring by the supplemental process an activity of each of the associated plurality of authorized host computer processes that are currently active; and removing by the supplemental process the indication when at least one of the associated plurality of authorized host computer processes becomes inactive.

In some embodiments, the method comprises monitoring by the blocking driver assembly an activity of each of the at least one authorized host computer process; sending by the blocking driver assembly to the connection interface device an instruction to connect the protected storage device to the host processor when at least one authorized host computer process becomes active; and connecting by the connection interface device the protected storage device to the host processor only after the connection interface device receives the instruction from the blocking driver assembly to connect the protected storage device to the host processor when at least one authorized host computer process becomes active.

In some embodiments, a computer program product comprises at least one non-transitory computer readable medium having computer readable program instructions embodied therewith. The computer readable program instructions, when read by a processor of a host computer, configure the processor to execute program instructions for a blocking driver assembly; receive a communication by the blocking driver assembly from a connection interface device physically separate from and operatively coupled to the host processor after a protected storage device is operatively connected to the connection interface device; send a communication from the blocking driver assembly to the connection interface device instructing the connection interface device to couple the protected storage device to the host processor; and conditionally allow by the blocking driver assembly a host computer process to alter data stored on the protected storage device.

The foregoing summary is illustrative only and is not intended to be in any way limiting. In addition to the illustrative aspects, embodiments, and features described above, further aspects, embodiments, and features will become apparent by reference to the drawings and the following detailed description. Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

Figure 1A:
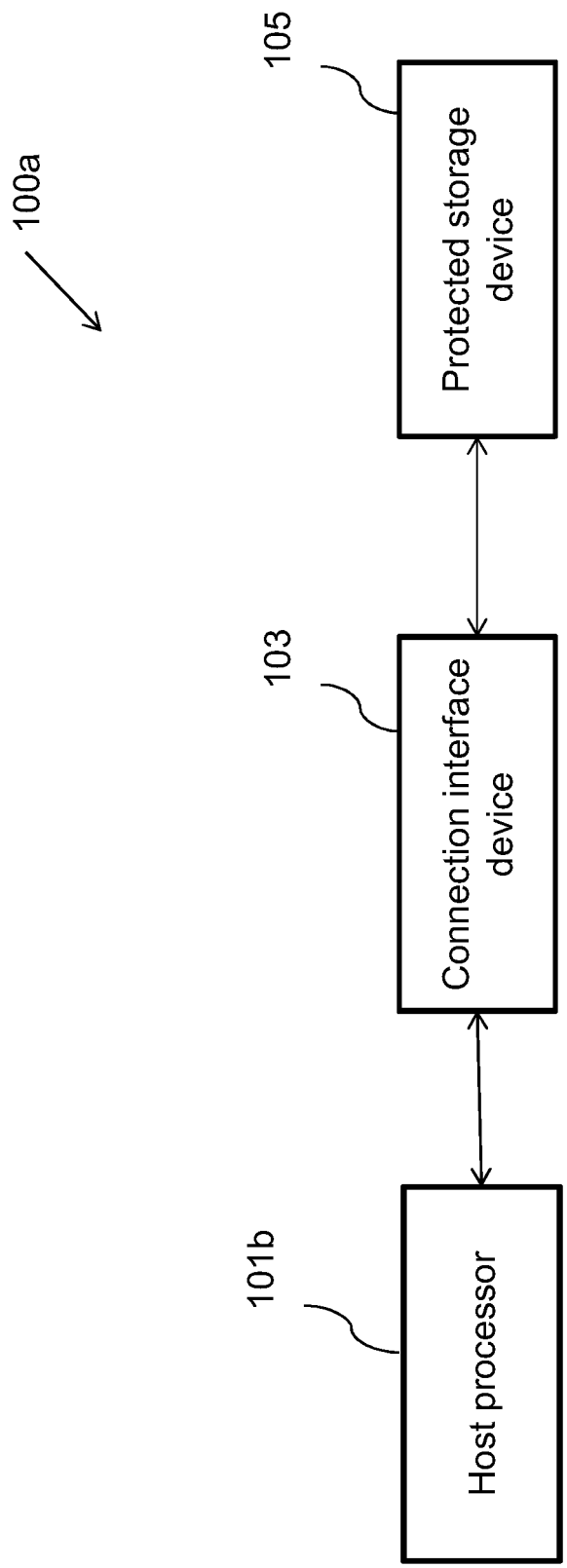
Figure 1B:
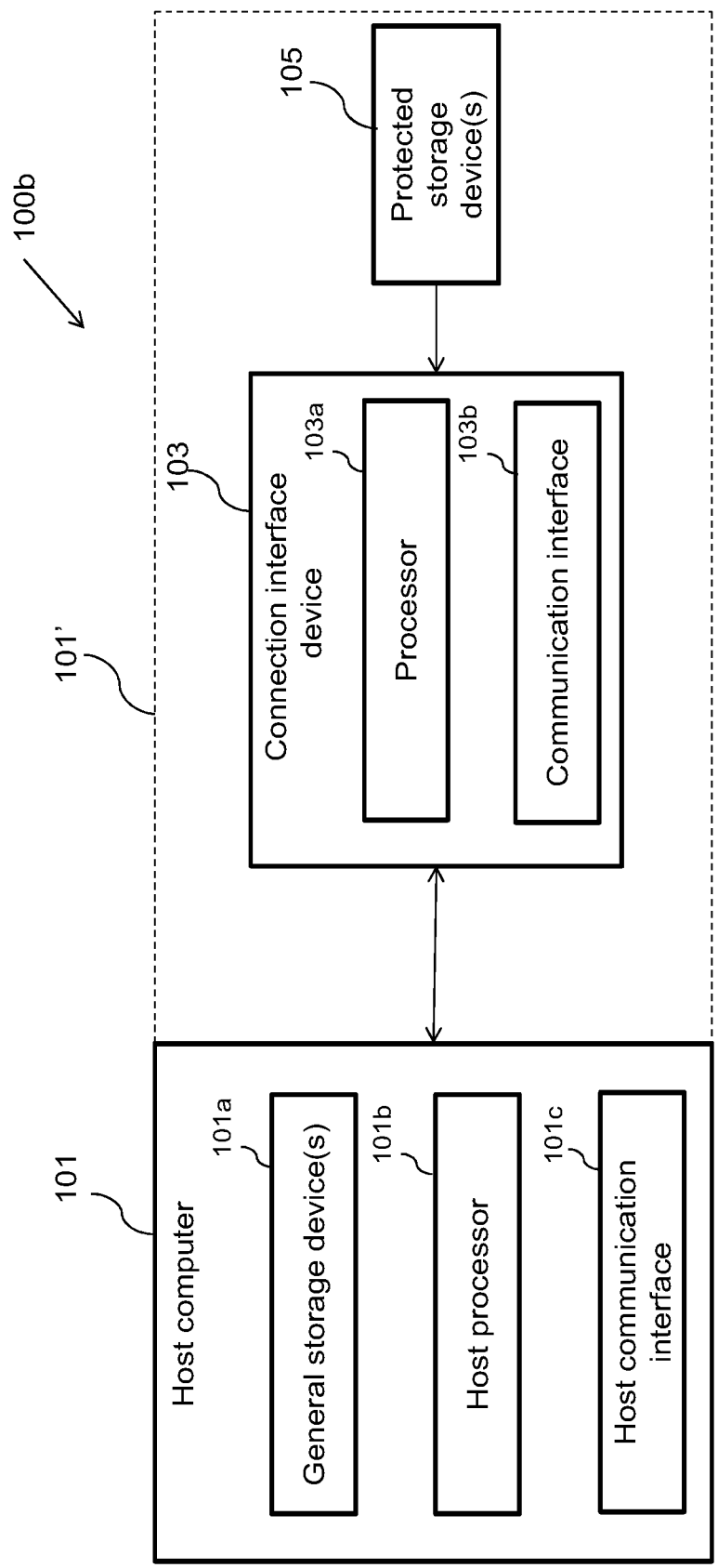
Figure 2:
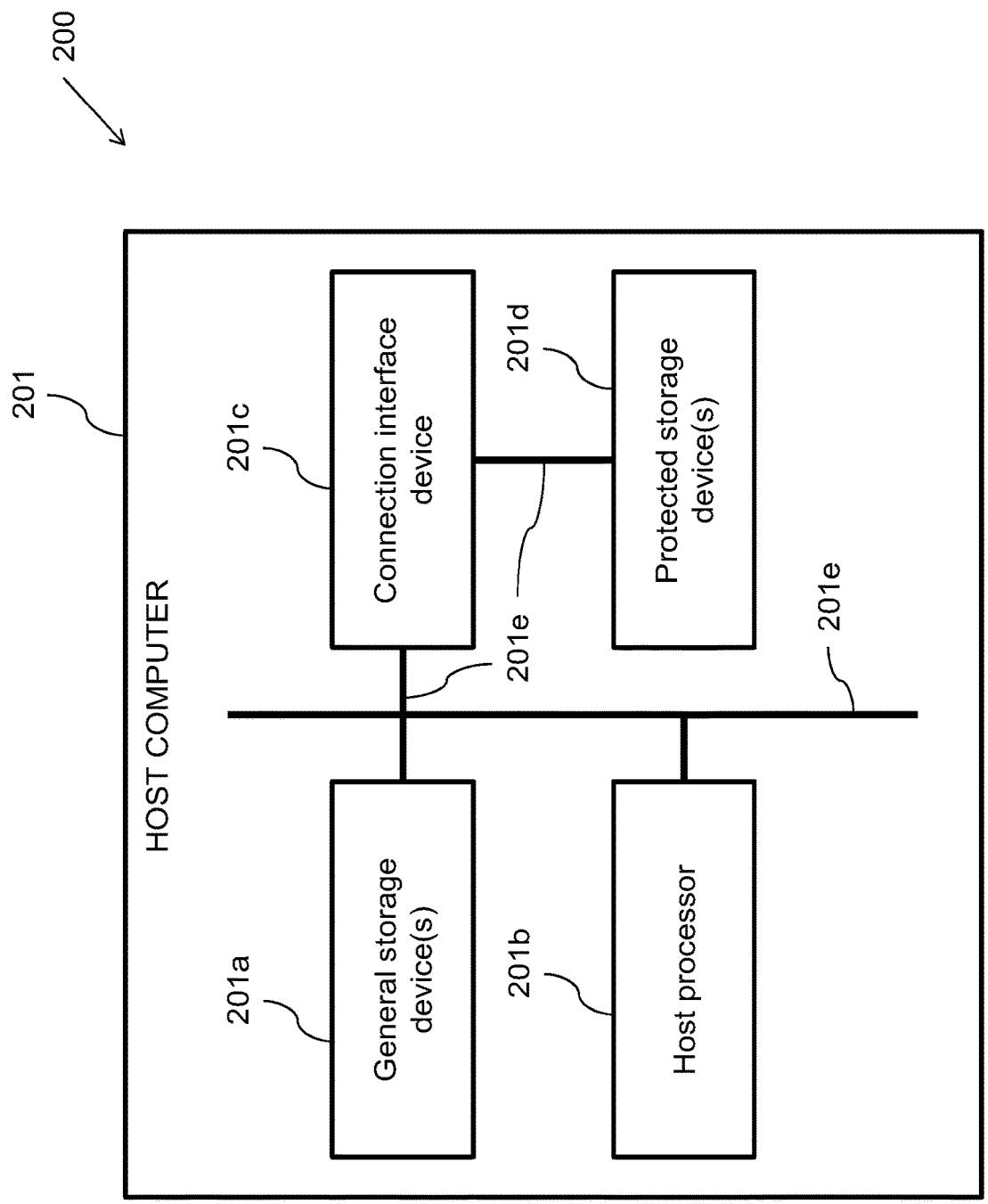
Figure 3A:
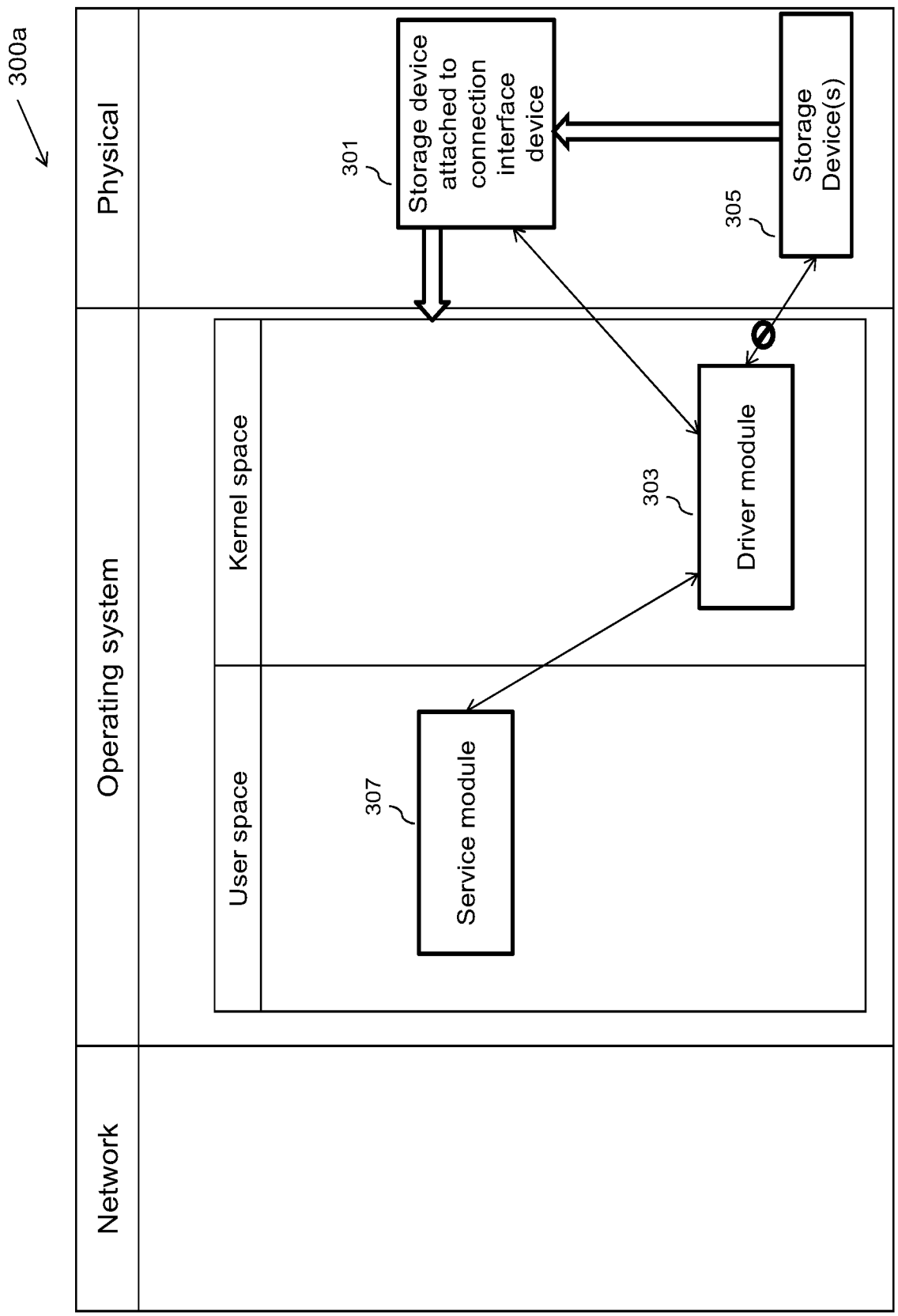
Figure 3B:
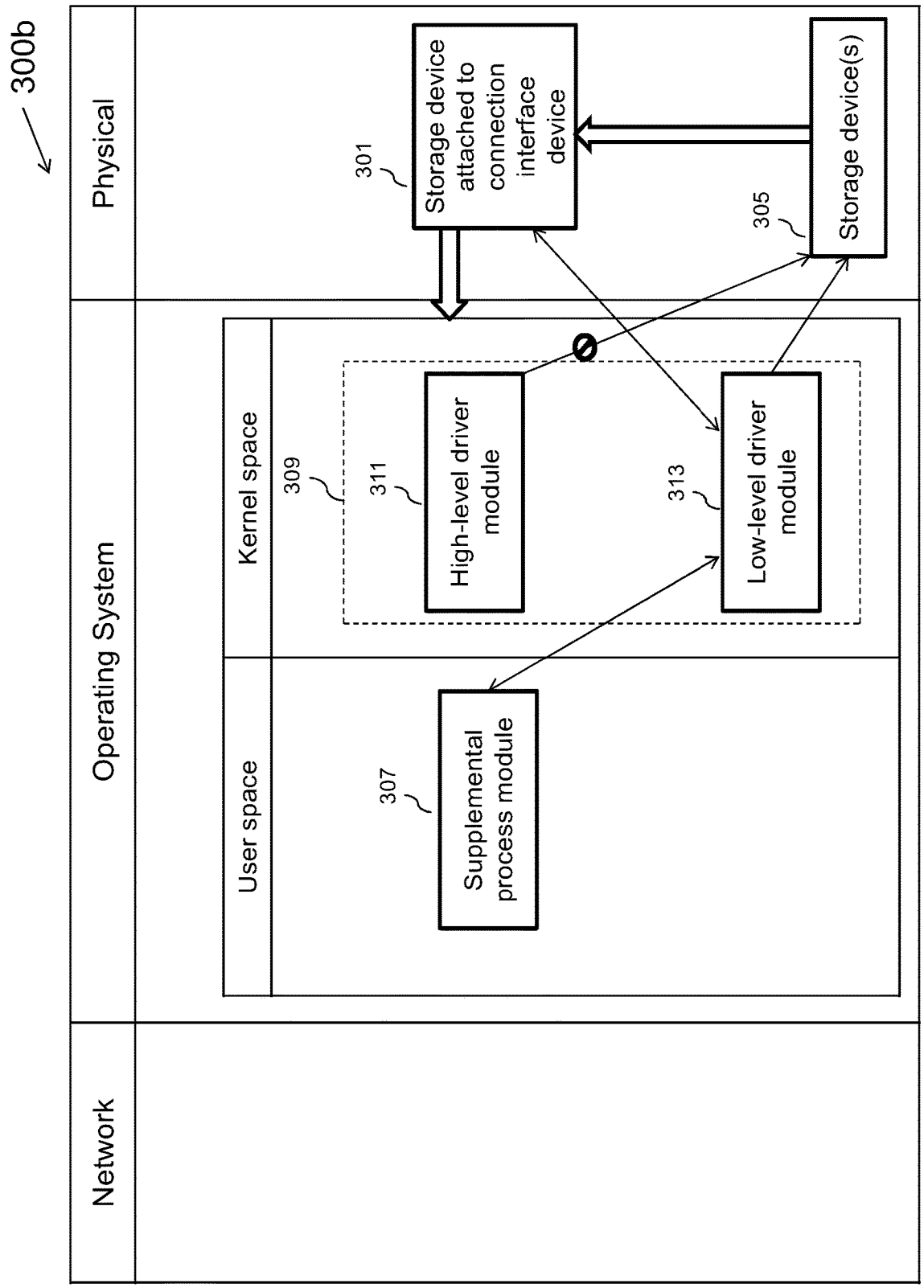
Figure 4A:
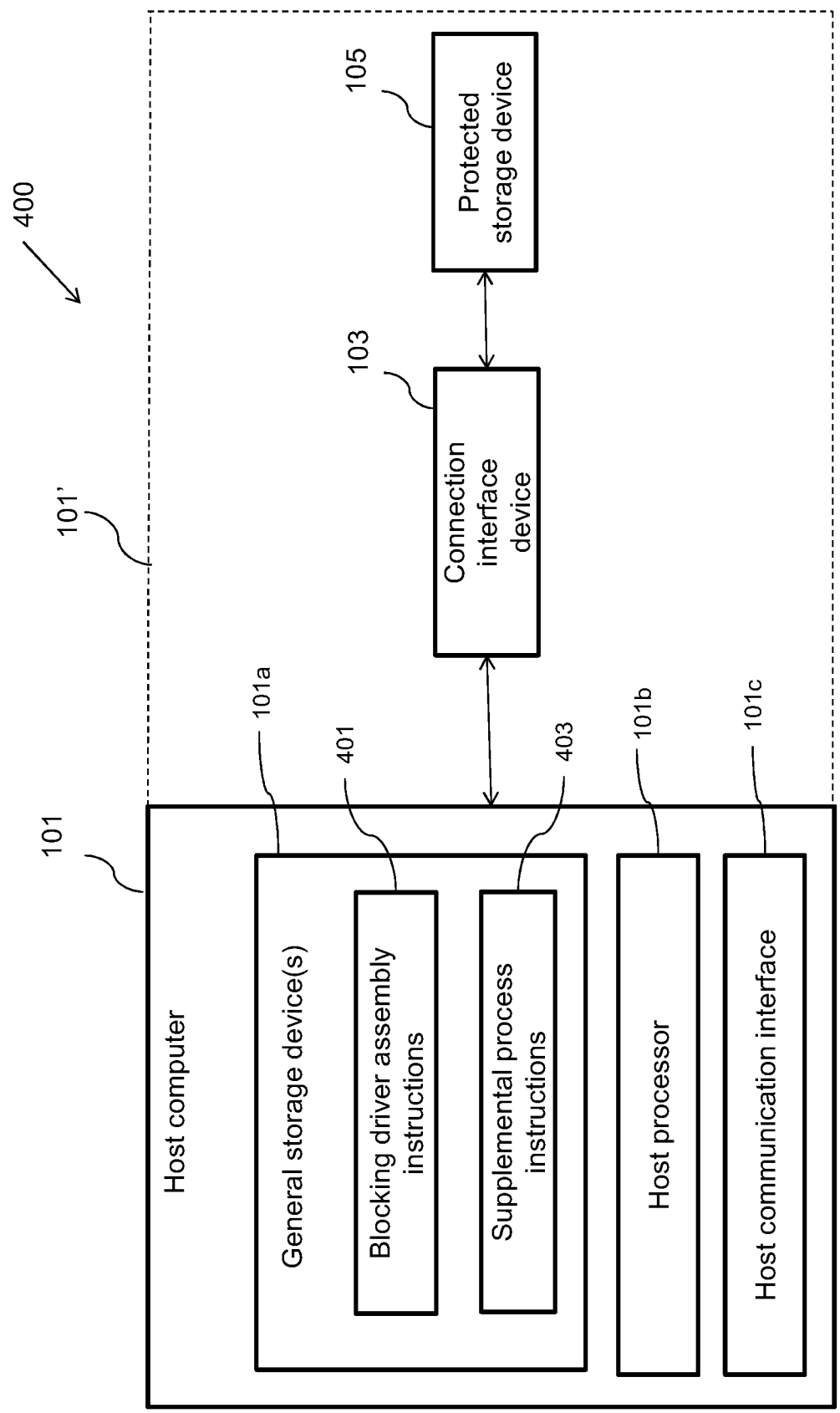
Figure 4B:
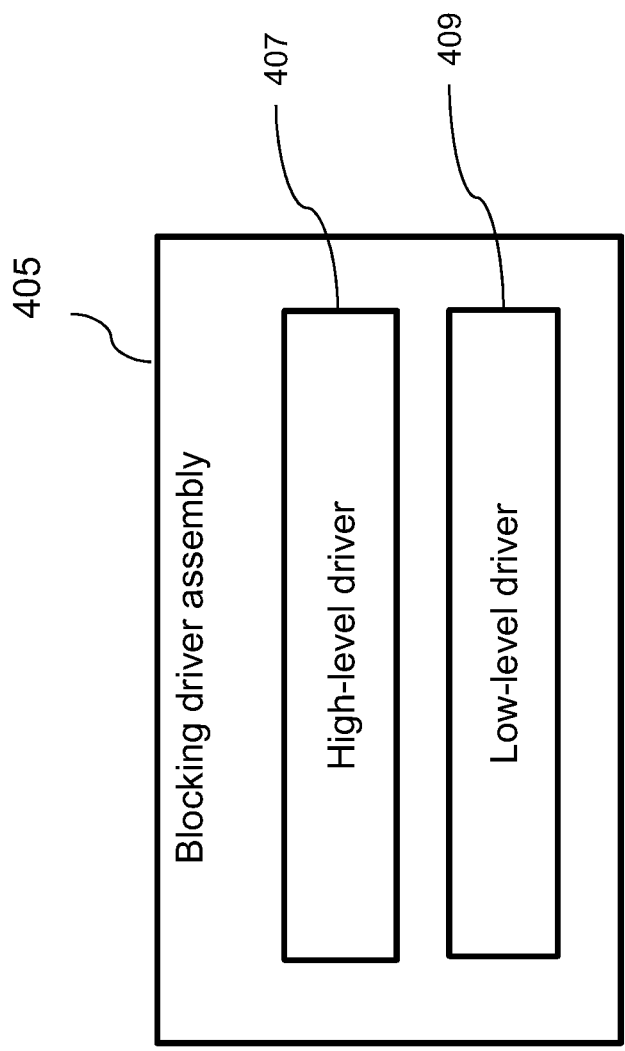
Figure 5:
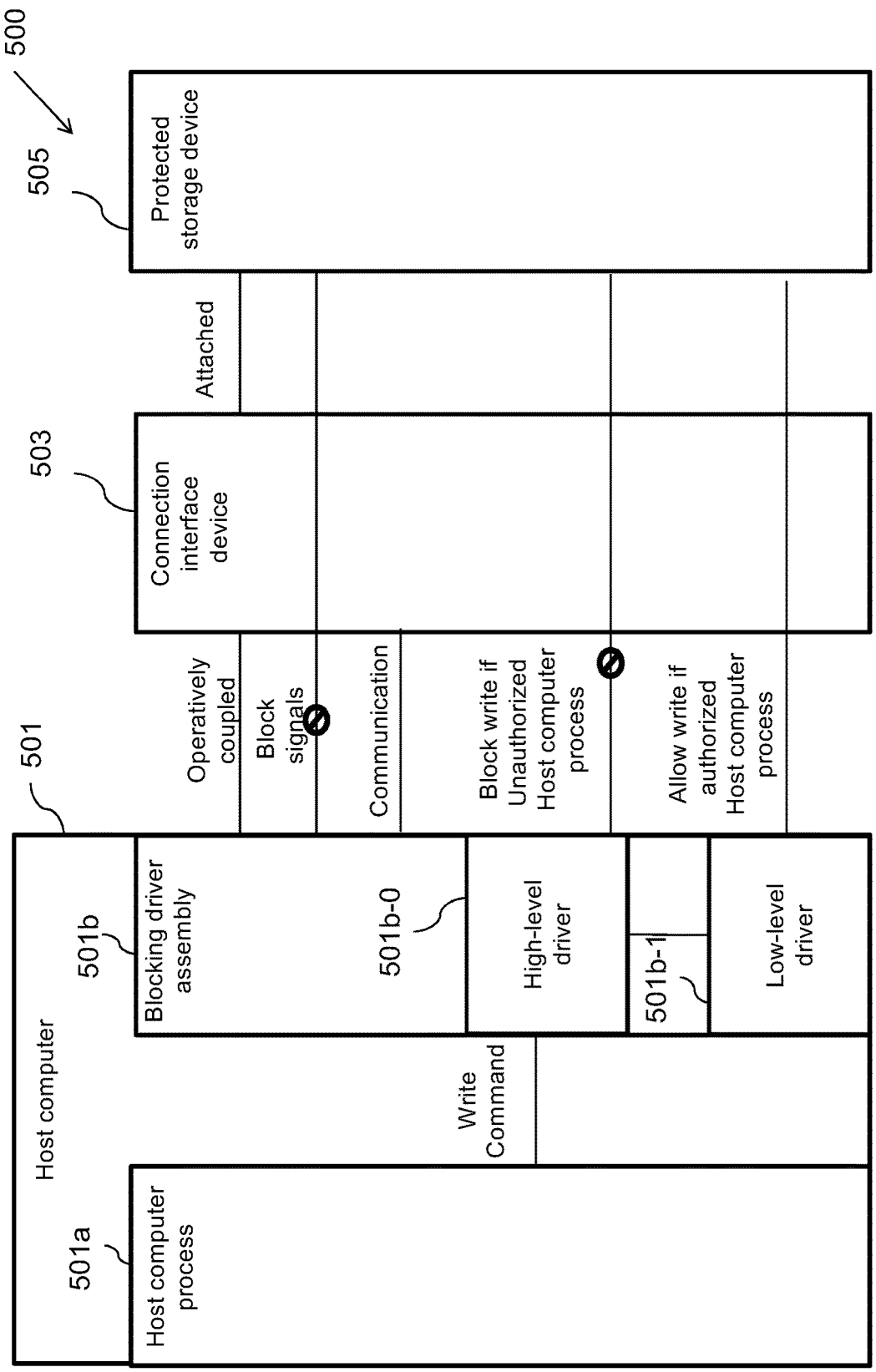
Figure 6A:
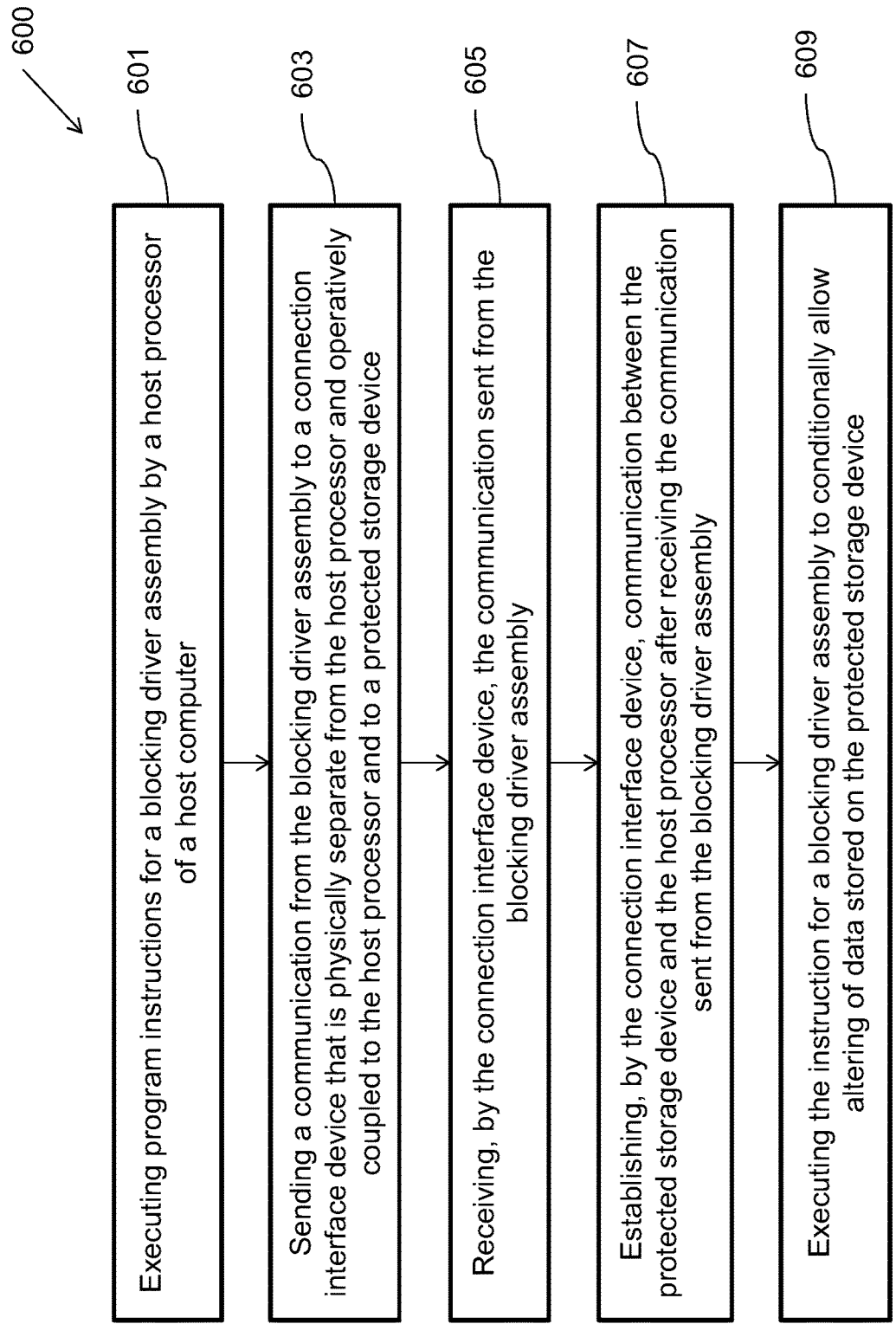
Figures 1, 6B:
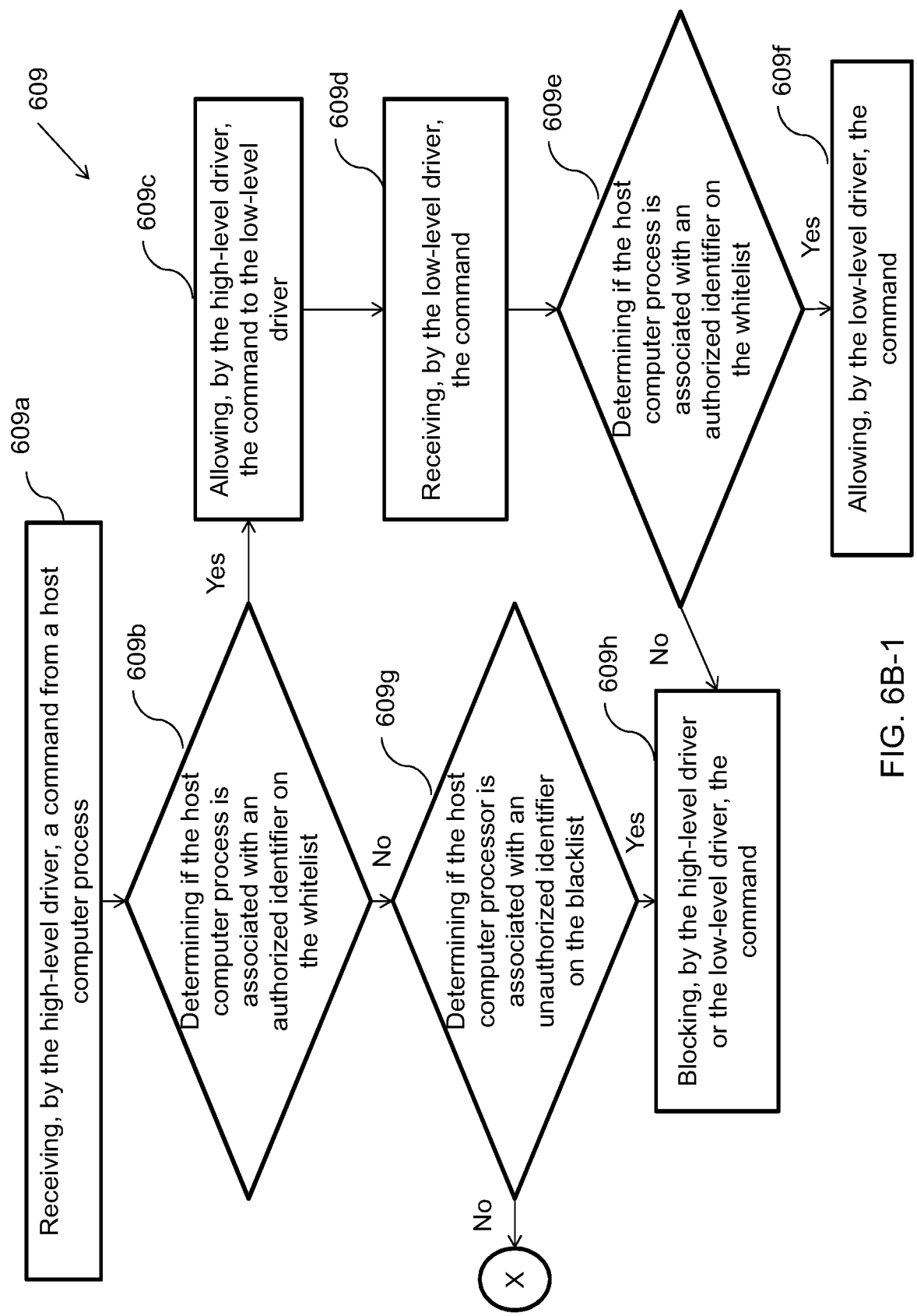
Figures 2, 6B:
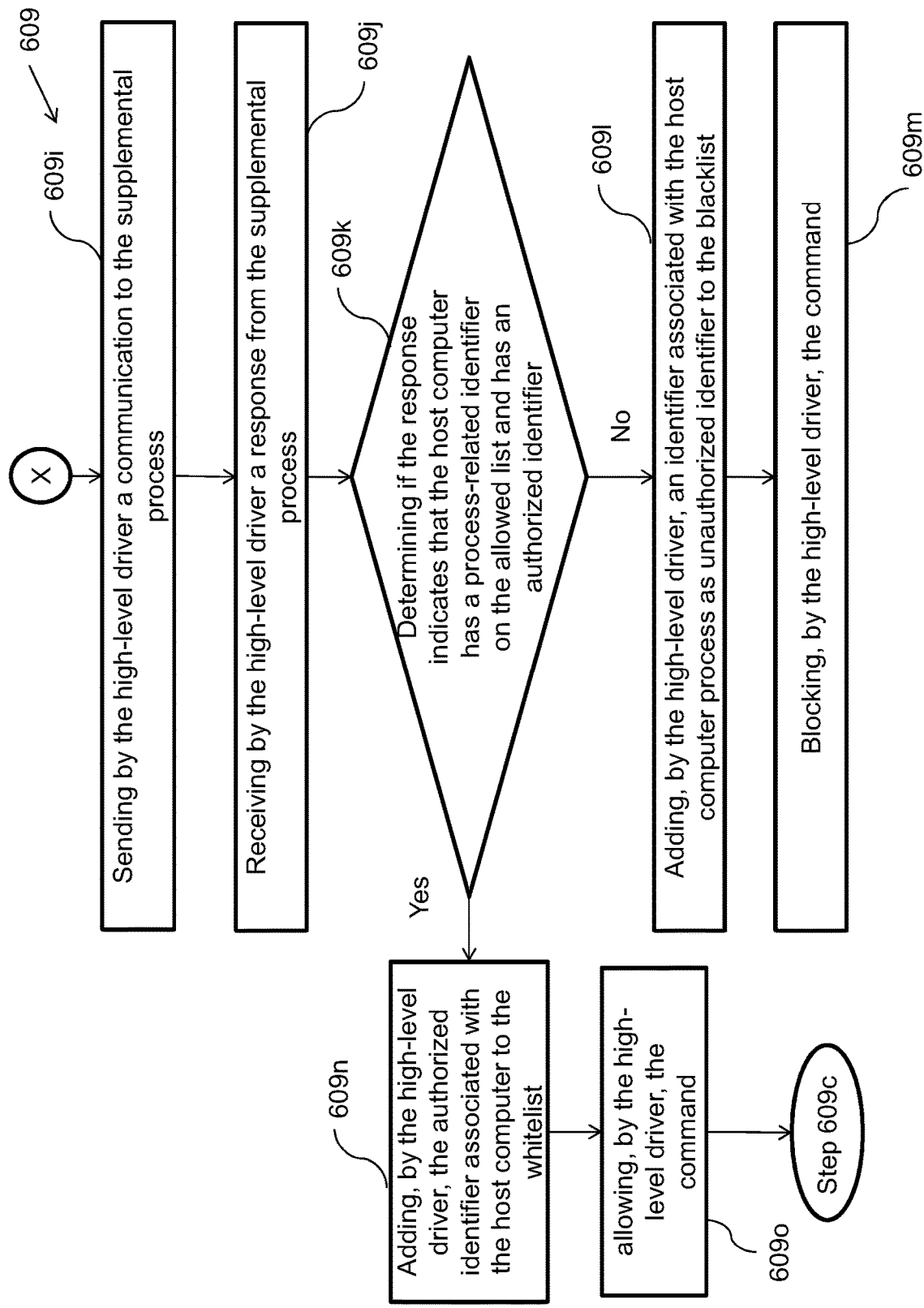
Figure 7A:
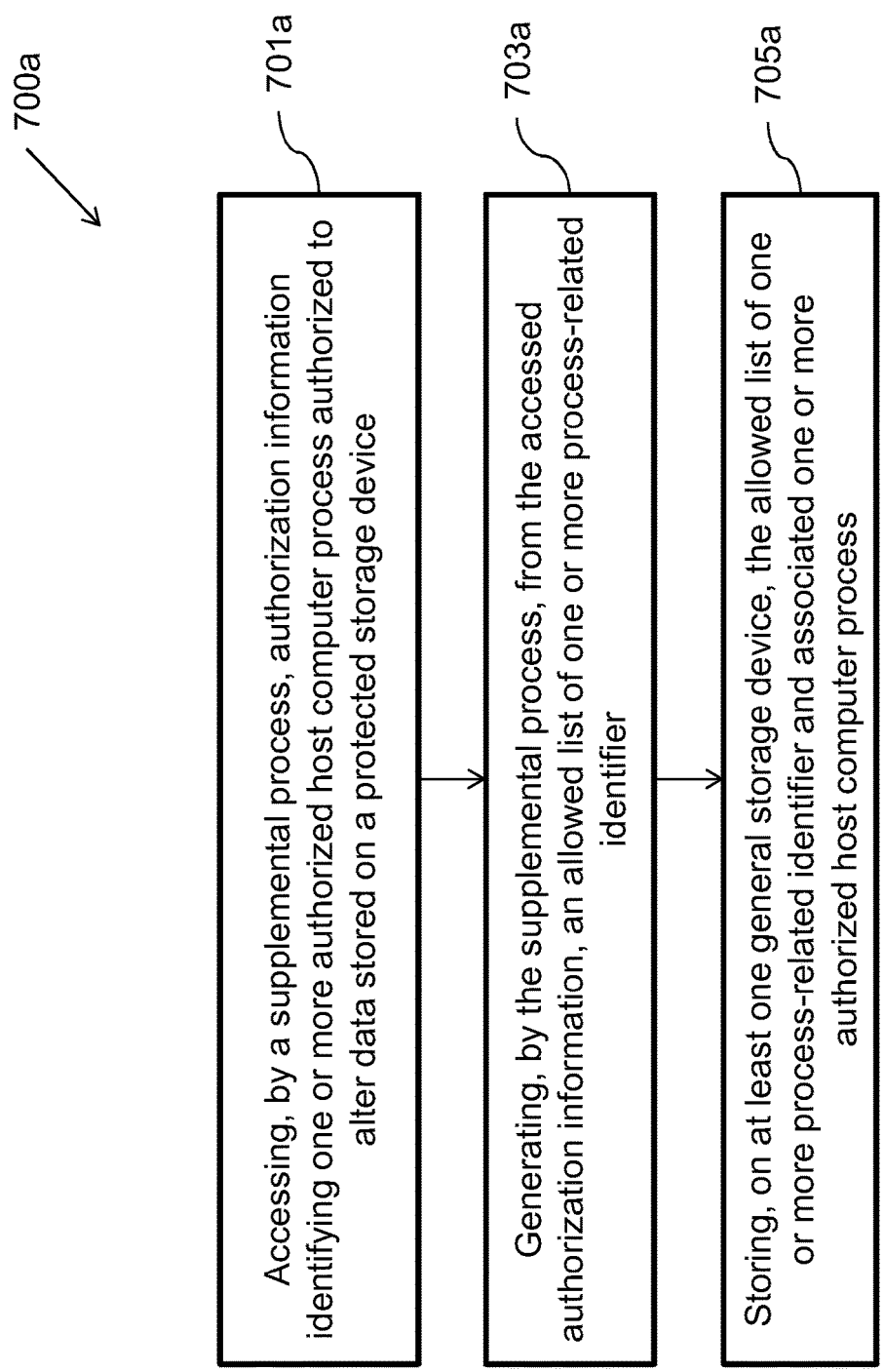
Figure 7B:
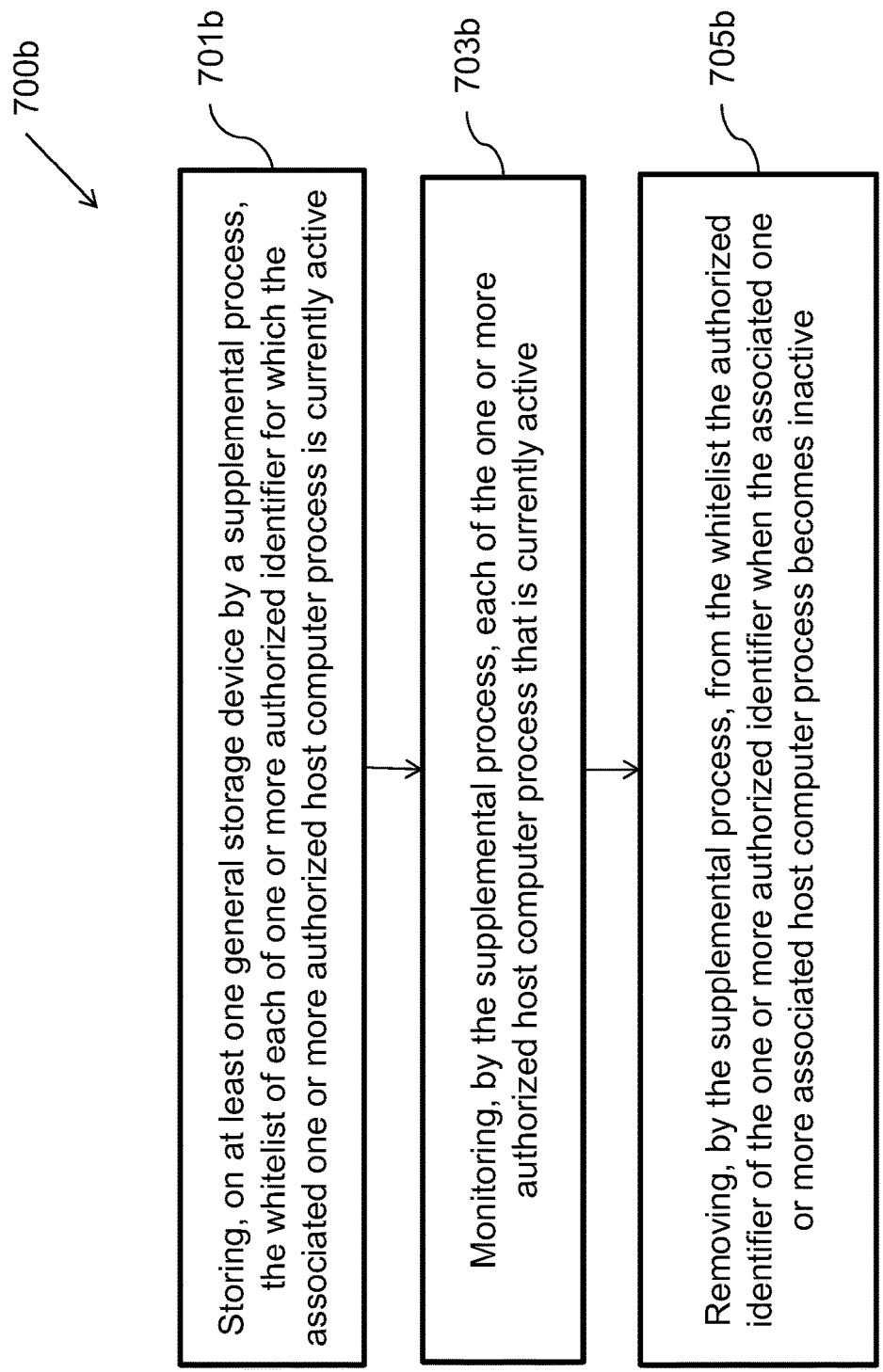

Having thus described example embodiments in general terms, reference will now be made to the accompanying drawings, which are not necessarily drawn to scale, and wherein:

FIG. 1A is a general overview of a combination default write-blocking system, in accordance with one or more than one example embodiment of the present invention;

FIG. 1B is a block diagram of another embodiment of the combination default write-blocking system, in accordance with one or more example embodiment of the present invention;

FIG. 2 is a block diagram of another embodiment of the combination default write-blocking system, in accordance with one or more example embodiment of the present invention;

FIGS. 3A and 3B are schematic overviews of principles used by some embodiments of the present invention;

FIG. 4A is a schematic block diagram of the combination default write-blocking system configured to conditionally allow altering of data stored on a protected storage device, in accordance with one or more example embodiment of the present invention;

FIG. 4B is a block diagram of a host processor configured as a blocking driver assembly, in accordance with one or more example embodiment of the present invention;

FIG. 5 is a schematic block diagram for exemplarily illustrating working of the combination default write-blocking system, in accordance with one or more example embodiment;

FIG. 6A is a flowchart illustrative of a method for conditionally allowing one or more host computer processes to alter data stored on the protected storage device, in accordance with one or more example embodiment;

FIGS. 6B-1 and 6B-2 together are a flowchart illustrative of a method of a blocking driver assembly conditionally allowing one or more host computer processes to alter data stored on the protected storage device, in accordance with one or more example embodiment;

FIG. 7A is a flowchart illustrative of a method for storing a first, allowed list of one or more than one process-related identifier, in accordance with one or more example embodiment; and FIG. 7B is a flowchart illustrative of a method of storing a second, whitelist of one or more authorized identifier, in accordance with one or more example embodiment.

DETAILED DESCRIPTION

Some embodiments of combination default write-blocking systems and methods are described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the systems or methods disclosed herein. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," "files," and similar terms may be used interchangeably to refer to data capable of being displayed, transmitted, received and/or stored. Thus, use of any such terms should not be taken as limitations. The term "invention" as used herein refers generally to features or concepts included in the described and illustrated examples without limitation. The appended claims specifically define selected inventions for consideration.

Ordinal terms such as "first", "second", and "third" are used to distinguish or identify various members of a group, or the like, in the order they are introduced in a particular context and are not intended to show serial or numerical limitation, or be fixed identifiers for the group members. Accordingly, the ordinal indicator used for a particular element may vary in different contexts. Unless otherwise indicated, the terms "first," "second," "third," etc. are used herein merely as labels, and are not intended to impose ordinal, positional, or hierarchical requirements on the components to which these terms refer. Moreover, reference to, e.g., a "second" component does not require or preclude the existence of a lower-numbered item (e.g., a "first" item) and/or a higher-numbered component (e.g., a "third" item).

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the concepts disclosed. Further, it is to be understood that the phraseology and terminology employed herein are for the purpose of the description and should not be regarded as limiting. Any heading utilized within this description is for convenience only and has no legal or limiting effect.

A combination default write-blocking system and a method are provided herein in accordance with example embodiments for conditionally allowing one or more host computer processes to alter data stored on a protected storage device. In various embodiments, the combination default write-blocking system may include a host processor of a host computer, a connection interface device, and a protected storage device. In various embodiments, the host computer may include a general storage device storing at least one authorized identifier of at least one host computer process and the host processor configured as a blocking driver assembly. In various embodiments, the connection interface device, being physically separate from the host processor, may operatively couple the host processor and the protected storage device. The connection interface device may be further configured to communicate with the blocking driver assembly and selectively establish communication between the protected storage device and the host processor after the communication between the connection interface device and the blocking driver assembly.

In various embodiments, the blocking driver assembly may communicate with the connection interface device and allow a host computer process associated with an authorized identifier to alter data stored on the protected storage device. Further, the blocking driver assembly may prevent the host computer process not associated with the authorized identifier from altering the data stored on the protected storage device. To that end, when an unauthorized host computer process (including a malfunctioning application and a host computer process not associated with the authorized identifier) attempts to alter the data or files stored on the protected storage device, the combination default write-blocking system may block the corresponding write command from the unauthorized host computer process. Further, the combination default write-blocking system allows only authorized host computer processes to edit the data or the files stored on the protected storage device. Therefore, the combination default write-blocking system may mitigate ransomware attacks and avoid data corruption or file system corruption.

Additionally, the combination default write-blocking system may provide process level write authorization for accessing the protected storage device connected to the host computer through the connection interface device. Further, the disclosed combination default write-blocking system may be effective in mitigating ransomware attacks, by using the connection interface device. In some examples, this connection interface device defaults in such a way that a signal path between the protected storage device and the host computer processor is interrupted. In other words, the protected storage device is physically disconnected from the host processor or 'air gapped' and the host processor is not able to detect the protected storage device. Once the blocking driver assembly is running and the connection interface device is coupled to the host processor, and any other conditions are satisfied, a switch is closed. This couples the protected storage device to the host processor. The host processor then typically mounts the protected storage device, such as by assigning a drive letter, and the blocking driver assembly can then selectively control which process or processes to allow to alter the protected storage device.

If such a system is attacked by the ransomware virus, then the virus will see the protected storage device, will read the files, and then try to write encrypted files back to the protected storage device. However, due to the blocking driver assembly and its associated functionality, the virus (or any other unauthorized process trying to write) will preferably receive an 'error' status stating that the protected storage device is write protected. This is because the virus will not have an authorized identifier that will be used to allow the virus to alter the data in the protected storage device. Thus, the combination default write-blocking system described herein can provide a robust protection mechanism for host computer data, thus, providing a high level of data integrity and security. Further, such a combination default write blocking system can be implemented to have reduced computation and storage requirements, as compared to conventional solutions for data security.

FIG. 1A illustrates a general overview of a combination default write-blocking system 100a for conditionally allowing one or more host computer processes to alter data stored on a protected storage device, in accordance with one or more example embodiments. As illustrated in FIG. 1A, the combination default write-blocking system 100a (also referred as system 100a) may include a host processor 101b, a connection interface device 103, and a protected storage device 105 as major computational components. In various embodiments, each of the components of system 100a (i.e. host processor 101b, connection interface device 103, and protected storage device 105) may be physically separate from each other component of system 100a.

In yet other embodiments, each of the components of the system 100a (i.e. host processor 101b, connection interface device 103 and protected storage device 105) may only be computationally separate from each other. For that matter, the connection interface device 103 and the protected storage device 105 may be embodied to be a part of a host computer 101, as will be discussed in conjunction with FIGS. 1B and 2. However, protected storage device 105 may be attached, connected, or operatively coupled to connection interface device 103. Connection interface device 103 may in-turn operatively couple to host processor 101b.

Host computer processor 101b may be part of a host computer, such as a general purpose computer system, a server, a laptop, a tablet, a smart phone, or a group of computing systems. In some example embodiments, a host computer may store program instructions for a blocking driver assembly, which may conditionally allow one or more host computer processes to alter data (i.e. writes) on at least one connected protected storage device 105.

In some other example embodiments, the program instructions for the blocking driver assembly may be stored on connection interface device 103. Connection interface device 103 may be, for example, a write-blocking system such as a write-blocker device or any other connection interface devices known in the art, which acts as a connection bridge for communication between the host processor 101b and protected storage device 105 as described in example embodiments herein.

In some example embodiments, protected storage device 105 may be a database configured to store data or files for one or more software applications such as business applications, IT (information technology) service applications, health care applications and the like, as well as operating systems. Hereinafter, 'software application' and 'host computer process' may be interchangeably used to mean the same. The one or more host computer processes may be executable software applications stored on host computer 101. In some other example embodiments, protected storage device 105 may be a suspect storage device of forensic industry. Protected storage device 105 may include, among other things one, a plurality, or a combination of a hard-drive disk, a floppy disk, a tape, a compact disc (CD), a blue-ray disc, a USB (universal serial bus) flash drive, a secure digital card (SD card), a conventional non-transitory protected storage device like a random access memory (RAM), and a solid state drive (SSD). As an example, protected storage device 105 may be one or more than one device that is configured in a redundant array of inexpensive disks (RAID) and/or just a bunch of disks (JBOD) configuration. As will be illustrated in the following embodiments, protected storage device 105 may be accessible based on the hardware combination default write-blocking system 100a disclosed herein.

FIG. 1B illustrates a block diagram of an embodiment of the combination default write-blocking system 100a for conditionally allowing one or more host computer process to alter data stored on one or more protected storage device, in accordance with one or more example embodiment. A combination default write-blocking system, shown generally at 100b (also referred as system 100b), may include a host computer 101, a connection interface device 103, and a protected storage device 105. Host computer 101 may include storage means such as at least one general storage device 101a, a processing means such as at least one host processor 101b, and a communication means such as at least one host communication interface 101c. General storage device 101a may be non-transitory and may include, for example, one or more volatile memory (i.e. a Random Access Memory (RAM) of host computer 101) and/or one or more non-volatile memory (for example, a hardware drive and the like). In other words, for example, general storage device 101a may be an electronic storage device (for example, a computer readable storage medium) comprising gates configured to store data (for example, bits) that may be retrievable by a machine (for example, a computing device like host processor 101b). General storage device 101a may store information, data, content, applications, instructions, or the like, for enabling host computer 101 to carry out various functions in accordance with an example embodiment. For example, general storage device 101a may buffer input data for processing by host processor 101b. As exemplarily illustrated in FIG. 1B, general storage device 101a may store instructions for execution by host processor 101b.

Host processor 101b may be embodied in a number of different ways. For example, host processor 101b may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, host processor 101b may include one or more processing cores configured to perform independently. A multi-core processor may enable multiprocessing within a single physical package.

Additionally, or alternatively, host processor 101b may include one or more processors capable of processing large volumes of workloads and operations to provide support for big data analysis. In an example embodiment, host processor 101b may be operatively coupled to at least one general storage device 101a to conditionally allow altering of data stored (writes) on one or more protected storage devices such as protected storage device 105. Host computer 101 may be accessed using host communication interface 101c. Host communication interface 101c may provide an interface for allowing various I/O (read/write) operations. For example, host communication interface 101c may include I/O interface for performing I/O operations (i.e. read or write operations) on the data stored on protected storage device 105 via connection interface device 103 as described in the example embodiments herein. As is described in further detail with reference to FIG. 2, in other embodiments, a host computer 101', in addition to the components of host computer 101, may also include connection interface device 103 and/or protected storage device 105.

Connection interface device 103 may include a processing means such as a processor 103a and a communication means such as at least one communication interface 103b. Additionally, connection interface device 103 may include a storage means such as memory for storing instructions executed by processor 103a as described in the example embodiments herein. Processor 103a may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like.

In an example embodiment, processor 103a may establish communication between host computer 101 and protected storage device 105. The connection interface device can either be a standalone dock-like product, an assembly with protected storage device 105 contained as part of the host computer, or a circuit integrated into the protected storage device. In the latter case, the connection interface device may be a storage device that also includes a communication path that bypasses the switching circuit to connect certain downstream USB ports in an unprotected way.

Communication interface 103b, which may be a switch, may provide an interface (for instance, an I/O interface) operable by processor 103a for establishing a physical signal path between host processor 101b and protected storage device 105 via intervening communication structures, such as a computer bus, connectors, and the like.

FIG. 2 illustrates a block diagram of another exemplary embodiment of a combination default write-blocking system 200 for conditionally allowing one or more host computer processes to alter data stored on a protected storage device, in accordance with one or more example embodiments. As illustrated in FIG. 2, the combination default write-blocking system 200 (also referred as system 200) may include a host computer 201. Host computer 201 may include a general purpose computer system, a server, a laptop, a tablet, a smart phone, or a group of computing systems. In various embodiments, host computer 201 may include at least one general storage device 201a, a host processor 201b, a connection interface device 201c, a protected storage device 201d, and a bus 201e. General storage device 201a may be at least one general storage device 101a as described in the description of FIG. 1B. Host processor 201b may be host processor 101b as described in the description of FIG. 1B.

Connection interface device 201c may have similar functionalities to connection interface device 103 described in example embodiments described with reference to FIGS. 1A and 1B herein. However, connection interface device 201c may be located within or associated with host computer 201 to provide the functionalities as provided by connection interface device 103. To that end, connection interface device 201c may include a processor located within host computer 201. Further, in various embodiments, connection interface device 201c may be physically separate from host processor 201b; and connection interface device 201c may be operatively coupled to host processor 201b via bus 201e. The processor included in the connection interface device may be embodied as one or more of a coprocessor, a microprocessor, a controller, or the like. In some example embodiments, connection interface device 201c may include a physical switch physically separate from host processor 201b and may be selectively actuated by the processor in the connection interface device to operatively couple the host processor 201b to protected storage device 201d via bus 201e.

Protected storage device 201d may have similar functionalities to protected storage device 105 described in example embodiments disclosed with reference to FIGS. 1A and 1B herein. However, protected storage device 201d may be located within or associated with host computer 201. To that end, protected storage device 201d may be one or more than one storage device, and may be in the form of a hard drive disk, a floppy disk, a tape, a CD, a blue-ray disc, a USB flash drive, a RAM, a SD card, or a SSD associated with host computer 201. Further, in various embodiments, protected storage device 201*d* may be physically separate from the at least one general storage device 201*a* and host processor 201*b*. Indeed, protected storage device 201*d* may be accessible to host processor 201*b* via bus 201*e* and connection interface device 201*c*. To that end, protected storage device 201*d* may be connected, attached or operatively coupled to the switch in connection interface device 201*c* that connects protected storage device 201*d* to bus 201*e*. Bus 201*e* may be a communication channel between the components of system 200 that allows exchange of signals between the various components of the system 200.

In various embodiments, the combination default write-blocking system 200 may conditionally allow one or more host computer processes to alter data stored on protected storage device 201*d* and protected storage device 105, respectively. However, the combination default write-blocking system 200 and the combination default write-blocking system 100*b* may have functionalities like each other and may differ only in the arrangement of components embodied within the system 200 and the system 100*b*. For the purpose of brevity, the combination default write-blocking system 100*b* and software the combination default write-blocking system 200 are generalized as combination default write-blocking systems (In short, systems) and embodiments are explained with respect to the combination default write-blocking system 100*b*. However, the embodiments disclosed herein are also applicable to the combination default write-blocking system 200 described in the detailed description of FIG. 2. Reference to components of systems 101*a* and 101*b* and other default write-blocking systems in the following descriptions are thus also applicable to system 200.

FIGS. 3A and 3B are schematic overviews of principles used by some embodiments of combination default write-blocking systems 100*a*, 100*b*, and 200. According to some embodiments, the system configuration exemplarily illustrated in FIGS. 1A, 1B, and 2 may mitigate ransomware attack and avoid data corruption or file system corruption. To that end, some embodiments may configure protected storage device 105 as a database to store data, including files of one or more host computer processes as, for example a backup. However, even if the data is stored as backup in protected storage device 105, the data in protected storage device 105 may be prone to ransomware attack, when the protected storage device 105 is mapped to host computer 101. To that end, host processor 101*b* and connection interface device 103 may protect protected storage device 105. According to some embodiments, the write-blocking system may protect the data stored in protected storage device 105 while the protected storage device is coupled to host processor 101*b*.

FIG. 3A is a schematic overview of principles used by a write-blocking system 300*a*, according to some embodiments. Write-blocking system 300*a* may include a connection interface device 301 that selectively couples protected storage device(s) 305 to a blocking driver assembly or module 303, referred to here as simply a driver module, running in kernel space of the operating system of the host processor. A supplemental process, such as a service module 307, that may run in the user space of the operating system and be in communication with driver module 303, may also be in communication with connection interface device 301. Connection interface device 301 may be equivalent to connection interface device 103 as described with reference to FIGS. 1A and 1B.

In various embodiments, one or more protected storage device 305, which may be equivalent to protected storage device 105, may be configured for storing data including sensitive information of the one or more host computer process and may be connected or operatively coupled to connection interface device 301. In some example embodiments, host computer 101 may store instructions on a general storage device for write-blocking system 300*a*.

Further, in some embodiments, host processor 101*b* may execute the instructions for write-blocking system 300*a*. Driver module 303 of host computer 101 may communicate with connection interface device 301. For instance, driver module 303 may request connection interface device 301 to couple protected storage device 305 to host computer 101. To that end, connection interface device 301 may connect the protected storage device 305 to driver module 303, in response to communication between driver module 303 and connection interface device 301.

When a host computer process associated with host computer 101 sends a write command (for instance, a command to alter data stored on protected storage device 305), driver module 303 may receive the write command and block the write command. Service module 307 of host computer 101 may monitor driver module 303. When driver module 303 ceases running, also referred to as being active, service module 307 may disable the connection between host processor 101*b* and protected storage device 305. In some embodiments, service module 307 sends a request to connection interface device 301 to de-authenticate (shutdown) the connection between host processor 101*b* and protected storage device 305 (i.e., protected storage device 105). Connection interface device 301 may disable the connection between host processor 101*b* and protected storage device 305, in response to the request to de-authenticate. In some other embodiments, service module 307 and/or driver module 303 may constantly transmit heartbeat signals, i.e., signals at regular intervals, to connection interface device 301. When service module 307 or driver module 303 stops transmitting the heartbeat signals, connection interface device 301 may disable the connection between host processor 101*b* and protected storage device 305.

In this way, when host processor 101*b* of host computer 101 executes the instructions for write-blocking system 300*a*, host processor 101*b* may block writes on protected storage device 305. Indeed, as a default, the instructions for write-blocking system 300*a* do not allow any host computer process to write (alter data) on protected storage device 305 unless the particular host computer process is authorized to do so, such as by being associated with an authorized identifier stored on the host computer. However, when data is stored on protected storage device 305 as a backup, for example, write-blocking system 300*a* must allow writes by the backup process to alter the data stored on protected storage device 305 to maintain up-to-date backup files.

Further, allowing any host computer process to write on protected storage device 305 may make the data stored on protected storage device 305 vulnerable to a ransomware attack. Furthermore, host processor 101*b* may execute a plurality of host computer processes. To that end, driver module 303 may receive multiple write command requests from multiple host computer processes. As a result, allowing unmonitored writes on protected storage device 305 could lead to data corruption or file system corruption. By requiring an authorized process to be associated with an authorized identifier, driver module 303 controls which processes are allowed to alter data on the protected storage device and which ones are not. If no currently active process is associated with an authorized identifier, the default state for driver module 303 is then to prevent all commands that would alter data from reaching the protected storage device.

FIG. 3B illustrates a schematic overview of principles used by a combination default write-blocking system 300b to conditionally allow altering of data stored on protected storage device 305 and for mitigating ransomware attacks, according to some embodiments. In combination default write-blocking system 300b, driver module 303 depicted previously in FIG. 3A, may be formulated as a blocking driver assembly 309 comprising a high-level driver module 311, which may be a filter driver, and a low-level driver module 313, which may be a device driver. In various embodiments, high-level driver module 311 may store one or more identifiers (for instance, process identifiers) associated with the one or more host computer processes that are authorized to alter the data or files stored on protected storage device 305. Hereinafter, 'process identifier associated with the authorized host computer process' and 'authorized identifier' may be interchangeably used to mean the same.

When a host computer process sends a write command, high-level driver module 311 may receive and associate the write command to the corresponding host computer process. Further, high-level driver module 311 may determine if the host computer process that issued the write command is associated with an authorized identifier. Furthermore, high-level driver module 311 may block the write command if the host computer process that issued the write command is not associated with an authorized identifier. Furthermore, high-level driver module 311 may communicate the write command to low-level driver module 313, if the host computer process that issued the write command is associated with the authorized identifier.

Low-level driver module 313 may be further configured to determine if the host computer process that issued the write command is associated with an authorized identifier. Low-level driver 313 may block the command if the host computer process that issued the write command is not associated with an authorized identifier. Low-level driver 313 may allow the command to alter the data stored on protected storage device 305 if the host computer process that issued the write command is associated with an authorized identifier. As is discussed in further detail below, the high-level driver and the low-level driver may each maintain a local copy of a list of authorized identifiers for currently active host computer processes that may be referred to as a whitelist.

Further, in some embodiments, combination default write-blocking system 300b may be augmented with a supplemental process module 315, which may provide some additional functionality to combination default write-blocking system 300b. In some example embodiments, supplemental process module 315, which may also be referred to as a service module or a management module, may provide a whitelist management interface for managing a list of authorized host computer processes stored on at least one general storage device 101a. The supplemental process module may be a single module or it may be a combination of modules. Supplemental process module 315 may monitor high-level driver module 311 and low-level driver module 313.

Further, in some example embodiments, supplemental process module 315 may monitor host computer processes that are actively running on host computer 101 and create and maintain a list of currently active authorized host computer processes based on the monitored actively running processes. This list may be a local copy of the whitelist that the supplemental process module creates and maintains. Generally, combination default write blocking system 300b may maintain at least two lists for managing conditional access of write commands to the protected storage device. The at least two lists preferably include the whitelist of authorized identifiers associated with authorized host computer processes and a blacklist for process identifiers associated with unauthorized host computer processes.

In some embodiments, combination default write blocking system 300b may also include an allowed list of host computer processes that are authorized to alter data on the protected storage device regardless of whether or not they are currently active, an allowed signing certificates list, and a list of processes that the provider failed to validate. The list of authorized processes, i.e., the allowed list, may be predefined and included in combination default write blocking system 300b in a predefined manner, such as at compile time or as identified by an authorized user. An authorized identifier may be added to the whitelist when the supplemental process determines that the associated process is on the predefined allowed list of authorized processes and becomes active.

Combination default write-blocking system 300b may conditionally allow altering of data on protected storage device 305 based on these lists. To that end, when an unauthorized host computer process (including a malfunctioning or malicious application/process) tries to alter data stored on protected storage device 305, combination default write-blocking system 300b may block the corresponding write command from the host computer process if it is not associated with an authorized identifier. The default write-blocking system then preferably provides an error status to the unauthorized host computer process. Combination default write-blocking system 300b thereby may mitigate or avoid a ransomware attack by preventing a ransomware process from altering the data.

FIG. 4A is a schematic block diagram of a combination default write-blocking system 400 configured to conditionally allow altering of data stored on protected storage device 105, in accordance with one or more example embodiments. As illustrated in FIG. 4A, combination default write-blocking system 400 (also referred to as system 400) may be configured as systems 100a, 100b, 200, or 300, and may include host computer 101, connection interface device 103, and protected storage device 105 or a combined host computer 101' that also includes connection interface device 103 and protected storage device 105. Host computer 101 may include at least one general storage device 101a, host processor 101b, and host communication interface 101c, as exemplarily explained in the detail description of FIG. 1B.

At least one general storage device 101a may store program instructions for a blocking driver assembly, referred to as blocking driver assembly instructions 401. In various embodiments, when host processor 101b executes blocking driver assembly instructions 401, host processor 101b may conditionally allow one or more host computer processes to alter the data stored on protected storage device 105. Additionally, in some example embodiments, at least one general storage device 101a may be further configured to store at least one identifier associated with the at least one host computer process as at least one authorized identifier, when the associated at least one host computer process is authorized to alter the data or the files stored on protected storage device 105 (which process may also be referred to as an authorized host computer process).

In some example embodiments, at least one general storage device 101a may store an authorized identifier for an associated plurality of authorized host computer processes, where each of the associated plurality of authorized host computer processes are authorized to alter data stored on protected storage device 105. A list of a plurality of authorized identifiers, such as a whitelist of authorized identifiers of a plurality of authorized host computer processes that are actively running (i.e. active during a run-time) on host computer 101. The identifiers in the whitelist thus serve as indications that the associated authorized host computer processes are currently active.

In some embodiments, a supplemental process may be configured as a management or service process configured to perform one or more management functions, including but not limited to, user authentication, managing user's interactions in creating the predefined allowed list of authorized host computer processes, generating a dynamic whitelist of authorized identifiers associated with currently active authorized host computer processes, and the like. In some example embodiments, when connection interface device 103 has operatively coupled the host processor 101b and protected storage device 105, the blocking driver assembly may block commands from host computer processes that are not authorized to alter data on the protected storage device. FIG. 4B is a block diagram of host processor 101b configured as a blocking driver assembly 405. Blocking driver assembly 405 may include a driver stack having a high-level driver 407 (also referred to as a first or filter driver 407) and a low-level driver 409 (also referred to as a second or device driver 409). Additionally, blocking driver assembly 405 may include a supplemental process. The blocking driver assembly 405 may monitor the activity of authorized host computer processes. A list identifying one or more authorized host computer process that is authorized to alter the data stored on protected storage device 105 may be stored on the at least one general storage device.

In some embodiments, blocking driver assembly 405 may communicate with connection interface device 103 when the at least one authorized host computer process or at least one of the at least one authorized host computer process becomes active. Blocking driver assembly 405 may send an instruction to connection interface device 105 to connect protected storage device 105 to host processor 101b of host computer 101 when the an authorized host computer process becomes active. In some example embodiments, low-level driver 409 may communicate with connection interface device 103 before the connection interface device establishes communication between protected storage device 105 and host processor 101b.

In some example embodiments, the communication between blocking driver assembly 405 and connection interface device 103 may be a one-way or a mutual authentication or other communication, referred to as a handshake, and may be encrypted. The communication between blocking driver assembly 405 and connection interface device 103 may allow connection interface device 103 to verify that blocking driver assembly 405 is operational on host computer 101. The communication between blocking driver assembly 405 and connection interface device 103 may allow connection interface device 103 to recognize blocking driver assembly 405 as an acceptable blocking driver assembly, and blocking driver assembly 405 to recognize connection interface device 103 as an acceptable connection interface device.

Once blocking driver assembly 405 communicates with connection interface device 103, connection interface device 103 may establish communication between protected storage device 105 and host processor 101b. Connection interface device 103 may establish communication between protected storage device 105 and host processor 101b only after connection interface device 103 receives an instruction from blocking driver assembly 405 to connect protected storage device 105 to host processor 101b. The communication between protected storage device 105 and host processor 101b may be via a physical connection, such as via a data-bus line and v-bus line.

When a host computer process sends a command (such as a write command) to alter data stored on protected storage device 105, blocking driver assembly 405 may receive the write command from the host computer process. In some example embodiments, high-level driver 407 of blocking driver assembly 405 may receive the write command. High-level driver 407 may associate the received write command with the host computer process that sent the write command. To that end, the host computer process may be referred to as an associated host computer process.

In some embodiments, high-level driver 407 may determine if the associated host computer process is associated with an authorized identifier stored in at least one general storage device 101a. The authorized identifier or the list of authorized identifiers may be referred as a whitelist of identifier(s) that are associated with authorized host computer processes that are currently active, for allowing the host computer processes associated with the authorized identifier(s) on the whitelist to alter data stored on protected storage device 105.

High-level driver 407 may produce and maintain another list, known as a blacklist or blocked list, which may include a list of identifiers of processes that are active and are not authorized to alter data stored on the protected storage device. If a process has an identifier that has been placed on the blacklist, then the high level driver is able to determine that the process is not authorized to alter data on the protected storage device by checking for the associated identifier on the blacklist. This reduces computational processing power and increases computational speed.

Further, when high-level driver 407 receives a "write" command from a process that is not on any of the whitelist or the blacklist, the high level driver may query a supplemental process that has access to the predetermined or allowed list of identifiers of authorized processes. The supplemental process may also maintain the whitelist of authorized identifiers for currently active associated host computer processes that are authorized to alter data on the protected storage device and are on the allowed list. In this example, the supplemental process then informs the high-level driver as to whether the process is associated with an authorized identifier. If the process is associated with an authorized identifier, then the high level driver adds the associated identifier to the whitelist maintained by the high level driver.

If the process identifier should not be added to the whitelist, the high level driver 407 adds that process identifier to the blacklist so it will not inquire again to the supplemental process about that process. However, if that process is associated with an authorized identifier, the supplemental process also preferably notifies the low level driver 409 to add the authorized identifier to a whitelist maintained by the low level driver. Further, when an authorized process ceases to be active, the supplemental process removes the associated identifier from the whitelist it maintains and instructs the high level driver and the low level driver to remove the associated identifier from the respective local copy of the whitelist that it maintains. In addition, when a process associated with an identifier on the blacklist has been detected to have become inactive, the identifier is removed from the blacklist. Also, the blacklist is cleared when the supplemental process stops executing.

As further background, in creating the lists the supplemental process may access a predetermined list of host computer processes that have been authorized to alter data on the protected storage device. The predetermined list may also be referred to as a first list or as an "allowed list". This may be a list of process names that should be allowed if they are detected. This list may be static at compile time. The "allowed list" may include a list of process IDs associated with processes that are approved to have write access to the protected storage device. The supplemental process may provide a user interface to a user of host computer 101 to receive a list identifying at least one host computer process that is authorized to alter data on protected storage device 105.

The whitelist is derived from the predetermined allowed list and is dynamic at run-time since it includes only authorized identifiers for processes that are on the allowed list that are currently active. The whitelist thus typically identifies a subset of processes on the allowed list. As mentioned, each of the high-level driver 407 and low-level driver 409 also preferably maintain a local copy of the whitelist.

Another list accessed by the supplemental process may be an "Allowed Signing Certificates List," which may be a list of signing certificates for processes for which the process name has been checked and the associated signature has been determined to be valid. The contents of a signature for a process are checked against this list to confirm they are consistent. This list is also preferably static at compile time.

Another list may be a "Failed to Validate List," which typically remains empty under normal conditions. When a process name is on the allowed list, but fails to pass a name check or signature validation, an event is logged in Window's MEL (master event list) and this list is maintained so the MEL is not flooded with inquiries.

Additionally or alternatively, high-level driver 407 may add a tag to the write command. The tag may indicate whether or not the associated host computer process is associated with an authorized identifier. High-level driver 407 may add the tag to a write command only if the host computer process that issued the command is associated with an authorized identifier. High-level driver 407 may communicate the tagged write command (i.e. the write command with the added tag) to low-level driver 409 or allow the tagged write command to pass to the low-level driver.

In some embodiments, high-level driver 407 may block (prevent) the write command from being communicated to low-level driver 409 if the tag indicates the associated host computer process is not associated with an authorized identifier. As used herein, unauthorized host computer processes may correspond to host computer processes that are associated with identifiers that are not listed as authorized identifiers on the whitelist. To that end, high-level driver 407 of blocking driver assembly 405 may block (prevent) the host computer process not associated with an authorized identifier from altering data stored on protected storage device 105.

In some embodiments, low-level driver 409 may receive the tagged write command from high-level driver 407. Low-level driver 409 may block or pass the write command based on the tag added to the write command. Low-level driver 409 may allow (i.e. pass) a write command having a tag indicating that the host computer process that issued the command is associated with an authorized identifier. Conversely, low-level driver 409 may block (i.e. prevent) a write command not having a tag indicating that the host computer process that issued the command is associated with an authorized identifier. To that end, low-level driver 409 of blocking assembly 405 may allow a host computer process associated with an authorized identifier to alter data stored on the protected storage device 105. Conversely, the low-level driver may block a host computer process not having an authorized identifier from altering data stored on the protected storage device 105. Further, blocking driver assembly 405, generally, or low-level driver 409, specifically, may communicate a write command with protected storage device 105 when the host computer process that issued the command is associated with an authorized identifier.

Further, in some embodiments, blocking driver assembly 405 may monitor the activity of authorized host computer processes to determine whether the monitored processes are active or inactive. Blocking driver assembly 405 may send, to connection interface device 103, an instruction to disconnect protected storage device 105 from host processor 101b, in response to determining the authorized host computer processes are all inactive on host computer 101. Connection interface device 103 may then disconnect protected storage device 105 from host processor 101b after receiving the instruction from blocking driver assembly 405 to disconnect protected storage device 105 from host processor 101b.

In some embodiments, the supplemental process may access authorization information on the at least one general storage device. Authorization information may include, among other things, a file name associated a host computer process, a file location associated with the host computer process, a user associated with the host computer process, and/or a publisher's or developer's digital signature associated with the at least one host computer process. The supplemental process may generate, from the accessed authorization information, the predetermined allowed list of the one or more authorized process-related identifiers. Each of the one or more process-related identifiers may be associated with one or more of the identified authorized host computer process. The supplemental process may be further configured to store, on at least one general storage device 101a, the allowed list of the one or more process-related identifiers and associated one or more of the identified authorized host computer processes.

In some example embodiments, the supplemental process may monitor each of the one or more authorized host computer processes associated with the one or more process-related identifiers on the allowed list for determining at least one authorized host computer process that is currently active on host computer 101. The supplemental process may generate an authorized identifier for one authorized host computer process in response to determining that the authorized host computer process is currently active. The authorized identifier for an authorized host computer process that is currently active may be a number. The number may be a number assigned by a Microsoft Windows operating system to the currently active process.

In some example embodiments, when high-level driver 407 determines the associated host computer process that issued the received command is not associated with an authorized identifier on the whitelist, high-level driver 407 may send a communication to the supplemental process inquiring as to whether the host computer process that issued the received command is an authorized host computer process. High-level driver 407 may receive a response from the supplemental process indicating whether or not the associated host computer that issued the received command is on the allowed list and has an associated authorized identifier. When the response indicates the associated host computer process is authorized to alter data stored on protected storage device 105 and since the associated host computer process is currently active, the high-level driver 407 then adds the associated authorized identifier to the whitelist.

High-level driver 407 may add an identifier associated with the associated host computer process as an unauthorized identifier to the blacklist, if the response from the supplemental process indicates that the associated host computer process that issued the received command is not associated with a process-related identifier on the allowed list. As used herein, an unauthorized identifier may correspond to an identifier of a host computer process that is not authorized to alter the data stored on protected storage device 105.

If the host computer process that issued the received command is not associated with an authorized identifier on the whitelist, high-level driver 407 may determine if the host computer that issued the received command is associated with an authorized identifier on the blacklist, before sending the communication to the supplemental process inquiring whether or not the host computer process that issued the command is associated with the process-related identifier on the allowed list. To that end, when a host computer process that has an unauthorized identifier on the blacklist sends a write command, high-level driver 407 blocks the write command. Accordingly, high-level driver 407 may not need to send a communication to the supplemental process. This reduces computational processing by the host processor. When low-level driver 409 receives a command issued by a host computer process, low-level driver 409 may determine if the host computer process that issued the received command is associated with an authorized identifier on the whitelist.

In some embodiments, connection interface device 103 may establish communication between protected storage device 105 and host processor 101*b*, only after the communication between the connection interface device 103 and both blocking driver assembly 405 and the supplemental process.

The supplemental process may monitor high-level driver 407 and low-level driver 409, and may send an instruction or message to connection interface device 103 to disconnect protected storage device 105 from host processor 101*b* when at least one of high-level driver 407 and low-level driver 409 ceases to be active. To that end, connection interface device 103 may disable the communication between protected storage device 105 and host processor 101*b* after receiving the instruction or the message to disconnect the protected storage device 105 from the host processor 101*b*.

As explained previously, in some embodiments, an authorized identifier may be stored on general storage device 101*a* for an associated plurality of authorized host computer processes that are authorized to alter data stored on protected storage device 105. The supplemental process may store on general storage device 101*a* an indication that the plurality of authorized host computer processes associated the common authorized identifier are currently active. This indication may be by listing the authorized identifier and identification of the associated plurality of authorized host computer processes on the whitelist. The supplemental process may monitor any activity of each of the associated plurality of authorized host computer processes to determine whether each of the associated plurality of authorized host computer processes are currently active. The supplemental process may remove from the whitelist the indication (process identifier) that the associated plurality of authorized host computer processes are currently active when at least one of the associated plurality of authorized host computer processes becomes inactive. Further, blocking driver assembly 405 may block each of the associated plurality of authorized host computer processes, when the indication that the associated plurality of authorized host computer processes associated with their corresponding authorized identifier are currently active is removed. In other words, blocking driver assembly 405 may block each of the associated plurality of authorized host computer processes, when at least one of the associated plurality of authorized host computer processes becomes inactive.

These examples indicate various ways that system 400 may conditionally allow altering data stored on protected storage device 105. To that end, when an unauthorized host computer process (including a malicious application) tries to alter data stored on protected storage device 105, system 400 may block the write command associated with the unauthorized host computer process. An error status may be returned to the unauthorized host computer process. The error status may indicate that protected storage device 105 is write protected for the unauthorized host computer process. Further, the system 400 allows only authorized host computer process(es) to alter data files stored on protected storage device 105. Therefore, system 400 allows for making backups of data on the one or more general storage device to be stored on protected storage device 105, while protecting protected storage device 105 by blocking data-altering commands from unauthorized host computer processes. Accordingly, the system 400 mitigates ransomware attacks and avoids the data corruption.

FIG. 5 is a schematic block diagram exemplarily illustrating working of a combination default write-blocking system 500, in accordance with one or more example embodiments. As illustrated in FIG. 5, combination default write-blocking system 500 (also referred to as system 500) may include a host computer 501, a connection interface device 503, and a protected storage device 505. Host computer 501, connection interface device 503, and protected storage device 505 are host computer 101, connection interface device 103, and protected storage device 105, respectively, described previously. It will be appreciated that host computer 501 may also include connection interface device 503 and protected storage device 505 so long as the functionality and physical and logical separation between host processor 101*b*, connection interface device 503, and protected storage device 505 are maintained. These components may be supported in a common housing or support structure while maintaining functional and physical separation.

A conventional host computer would store a host computer process (i.e. an executable software application) designed for a specific application, for example, a painting or photograph editor. Once the host computer is attacked by ransomware, the virus may encrypt all data (including files) that the virus finds, including data associated with the host computer process, and the virus may replace the original files with encrypted files. For instance, the virus may change headers of the files and update a file allocation table with the changed header files. Further, when the host computer process tries to access or alter the data files associated with the host computer process, the host computer process would not be able to access or alter the data files, as the original files are replaced with the encrypted files. Further, the encrypted files require a decryption key to access or alter the data files.

Another host computer process may be an application for backing up data stored on the host computer storage devices. The backup files are stored on the protected storage device(s). In performing the backup, the backup process accesses (reads) and alters (writes) data on the protected storage device(s).

Further, when the protected storage device is mapped to the conventional host computer to allow read and/or write operations, the protected storage devices are vulnerable to ransomware attack. Furthermore, unauthorized host computer processes that alter the data files stored in the protected storage device 505 may also lead to data corruption, such as file system corruption.

Write-blocking system 500 is able to mitigate against such corruption of data on a protected storage device 505. When host computer 501 is installed with the program instructions for blocking driver assembly 501*b* and is operatively coupled to connection interface device 503, the host computer does not see the protected storage device because the protected storage device is initially not connected to the host processor. Host processor 101*b* then executes the instructions for blocking driver assembly 501*b*, making blocking driver assembly 501*b* active on host computer 501. When the blocking driver assembly 501*b* is active on host computer 501, the blocking driver assembly 501*b* may communicate with connection interface device 503. Connection interface device 503 may then connect protected storage device 505 to host processor 101*b* after communicating with the blocking driver assembly, such as with a driver module in the blocking driver assembly. In some embodiments, connection interface device 503 may wait until a supplemental process, such as a service module, communicates with the connection interface device, after the driver module and/or service module receives a communication from the connection interface device.

The program instructions for blocking driver assembly may include instructions for a supplemental process, such as a service module, that is configured to communicate with connection interface device 503. Connection interface device 503 in turn may establish communication between host processor 101*b* and protected storage device 505 after the communication with the supplemental process.

In some embodiments, the supplemental process may access authorization information identifying one or more authorized host computer process, including host computer process 501*a*, on host computer 501, which is or are authorized to alter the data stored on protected storage device 505. The supplemental process may also provide an interface for a user of host computer 501 to add or remove information identifying one or more host computer process as being authorized to alter data stored on the protected storage device. The supplemental process may generate, using the accessed authorization information, an allowed list of process-related identifier(s) for the one or more authorized host computer process, including host computer process 501*a*, that is or are authorized to alter data stored on the protected storage device 505. The supplemental process may store the generated allowed list on a general storage device of host computer 501.

Further, the supplemental process may monitor each authorized host computer process, including host computer process 501*a*, listed on the allowed list to determine at least one authorized host computer process is currently active on host computer 501. The supplemental process may generate and store a whitelist of authorized identifier associated with authorized host computer processes that are currently active on host computer 501.

The supplemental process may determine when the whitelist has no authorized identifiers. During startup or run-time operation while the whitelist is empty, the supplemental process may not communicate with connection interface device 503 to establish communication between host processor 101*b* and protected storage device 505. When an authorized identifier is first added to the whitelist, the supplemental process may communicate with connection interface device 503 an instruction to establish communication between host computer 501 and protected storage device 505. To that end, connection interface device 503 may establish communication between protected storage device 505 and host processor 101*b* only after communicating with blocking driver assembly, and in particular with the supplemental process.

Further, in some embodiments, the supplemental process may communicate the whitelist to high-level driver 501*b*-0 and low-level driver 501*b*-1. When host computer process 501*a* sends a write command to alter the data stored on protected storage device 505, high-level driver 501*b*-0 may receive the write command and associate the received write command with host computer process 501*a*. High-level driver 501*b*-0 may determine if host computer process 501*a* is associated with an authorized identifier on the whitelist. If host computer process 501*a* is not associated with an authorized identifier on the whitelist, high-level driver 501*b*-0 may send a communication to the supplemental process to determine if host computer process 501*a* is associated with a process-related identifier on the allowed list and is associated with an authorized identifier. In some embodiments, if host computer process 501*a* is associated with a process-related identifier on the allowed list and is associated with an authorized identifier, high-level driver 501*b*-0 may add the associated authorized identifier to the whitelist. High-level driver 501*b*-0 will then allow host computer process 501*a* to alter data stored on protected storage device 505. Specifically, high-level driver 501*b*-0 then preferably communicates the received command to low-level driver 501*b*-1 for further communication of the write command to protected storage device 505 to alter data stored on protected storage device 505.

In some embodiments, if host computer process 501*a* is not associated with the process-related identifier on the first list, high-level driver 501*b*-0 may add an identifier associated with host computer process 501*a* as unauthorized identifier to the blacklist. Accordingly, high-level driver 501*b*-0 may then block host computer process 501*a* from altering data stored on protected storage device 505.

As has been mentioned, low-level driver 501*b*-1 may also receive the whitelist from the supplemental process. Once the supplemental process adds an authorized identifier to or removes an authorized identifier from the whitelist, the supplemental process may communicate the change to high-level driver 501*b*-0 and low-level driver 501*b*-1. Alternatively, once high-level driver 501*b*-0 changes a status of an authorized identifier on the whitelist, high-level driver 501*b*-0 may communicate the change to low-level driver 501*b*-1.

Further, low-level driver 501*b*-1 may determine if a host computer process 501*a* that produced a command received by the low-level driver is associated with an authorized identifier on the whitelist. If host computer process 501*a* is not associated with an authorized identifier on the whitelist, low-level driver 501*b*-1 may block the received command from being communicated to protected storage device 505. On the other hand, if host computer process 501*a* is associated with an authorized identifier on the whitelist, low-level driver 501*b*-1 may communicate the received write command to protected storage device 505 to alter data stored on protected storage device 505.

Therefore, system 500 may allow backing up of data from general storage devices by an authorized backup process on protected storage device 505, while protecting data stored on protected storage device 505 from being altered by a host computer process that is not authorized to alter data on the protected storage device. Accordingly, system 500 may mitigate a ransomware or other malware attack and avoids corruption of data on protected storage device 505 by host computer processes that are not authorized to alter data on the protected storage device.

FIGS. 6A, 6B-1, 6B-2, 7A, and 7B are flowcharts illustrating aspects of exemplary methods for conditionally allowing one or more host computer processes to alter data stored on a protected storage device, in accordance with one or more example embodiments. The methods may be used in conjunction with the combination default write-blocking systems described herein. Where appropriate, reference may be made to previously described components and systems that may be used in carrying out each step. These references are for illustration, and are not intended to limit the possible ways of carrying out any particular step of the method. The flowcharts illustrate operations performed by components of a default write-blocking system and may not recite the complete process or all steps of the method. Although various steps are described below and depicted in these figures, the steps need not necessarily all be performed, and in some cases may be performed in a different order than the order shown.

FIG. 6A illustrates a method 600 for conditionally allowing one or more host computer process to alter data stored on a protected storage device, in accordance with one or more example embodiments. Method 600 may be used in conjunction with systems 100*a*, 100*b*, 200, 300, 400, or 500, described previously. Method 600 may include installing blocking driver assembly instructions 401 on host processor 101*b*, connecting protected storage device 105 to connection interface device 103 if not already connected, and operatively coupling connection interface device 103 between host processor 101*b* and protected storage device 105. Host processor 101*b* may not be able to access protected storage device 105 until connection interface device 103 receives, from a blocking driver assembly running on host processor 101*b*, an instruction to connect protected storage device 105 to host processor 101*b* as has been described. In other words, connection interface device 103 may include an open switch between host processor 101*b* and protected storage device 105 until connection interface device 103 receives the instruction to connect protected storage device 105 to host processor 101*b*. A communication or signal path between the host processor and the switch is preferably established over a computer bus to which both are connected.

At a step 601, method 600 may include executing blocking driver assembly instructions 401 for blocking driver assembly 405 by host processor 101*b* of host computer 101. The blocking driver assembly instructions 401 may include supplemental process instructions 403. At a step 603, blocking driver assembly 405 may send a communication to connection interface device 103. Blocking driver assembly 405 may send to connection interface device 103 an instruction to connect protected storage device 105 to host processor 101*b*. The instruction may be encrypted.

At a step 605, connection interface device 103 may receive the communication sent from blocking driver assembly 405. For instance, the instruction may have been sent by the supplemental process within blocking driver assembly 405. Connection interface device 103 may decrypt the instruction if the instruction is encrypted.

At a step 607, connection interface device 103 may establish communication between protected storage device 105 and host processor 101*b* after receiving the communication sent from blocking driver assembly 405. In various embodiments, connection interface device 103 may establish communication between protected storage device 105 and host processor 101*b* only after receiving the instruction from blocking driver assembly 405.

At a step 609, blocking driver assembly 405 may conditionally allow the altering of data stored on protected storage device 105.

An example of step 609 is described in further detail with reference to FIGS. 6B-1 and 6B-2. In this embodiment, a blocking-driver assembly includes a high-level driver, a low-level driver, and a supplemental or service module. Step 609 may be used in conjunction with system 400 described in the detail description of FIGS. 4A and 4B, as well as other systems previously discussed.

Referring initially to FIG. 6B-1, a step 609*a* of step 609 may include receiving, by high-level driver 407, a command (for instance, a write command) from a host computer process such as host computer process 501*a*. The command may indicate a request made by the host computer process for altering data stored on protected storage device 105. High-level driver 407 may associate the received command with the host computer process that issued the received command.

A step 609*b* may include determining if the host computer process is associated with an authorized identifier on the whitelist. The whitelist may be received from the supplemental process as explained in the detailed description of FIGS. 4A and 4B.

In response to determining that the host computer process that issued the received command is associated with an authorized identifier on the second list, the method may continue with step 609*c*. Step 609*c* may include allowing by high-level driver 407 the command to be communicated to low-level driver 409. A step 609*d* may include receiving the command by low-level driver 409.

A step 609*e* may include determining if the host computer process that issued the command is associated with an authorized identifier on the whitelist. In some example embodiments, the low-level driver previously received the whitelist from the supplemental process as explained with reference to FIGS. 4A and 4B.

In response to determining that the host computer is associated with an authorized identifier on the white list, method 600*b* may continue with a step 609*f* that may include allowing, by low-level driver 409, the command to be communicated to protected storage device 105.

In response to determining at step 609*e* that the host computer process is not associated with the authorized identifier on the whitelist, low-level driver 409 at a step 609*h* may block the command from being communicated to protected storage device 105.

In response to determining that the host computer process that issued the received command is not associated with the authorized identifier on the whitelist at step 609*b*, at a step 609*g*, high-level driver 407 may determine if the host computer process is associated with an unauthorized identifier on the blacklist. In response to determining the host computer process is associated with an unauthorized identifier on the blacklist, at a step 609*h*, high-level driver 407 may block the command from being communicated to low-level driver 409, which thereby blocks the command from being communicated to protected storage device 105.

In response to determining at step 609*g* that the host computer process is not associated with an unauthorized identifier on the blacklist, at a step 609*i* included in FIG. 6B-2, high-level driver 407 may send a communication to the supplemental process. The communication sent from high-level driver 407 to the supplemental process may inquire of the supplemental process whether or not the host computer process that issued the received command is associated with a process-related identifier on the allowed list and has an authorized identifier. If so, the host computer process is authorized to alter data stored on protected storage device 105.

At a step 609*j*, high-level driver 407 may receive a response from the supplemental process. The response received from the supplemental process by high-level driver 407 may indicate whether or not the host computer process that issued the received command is associated with a process-related identifier on the allowed list and therefore is associated with an authorized identifier.

At step 609*k*, the high-level driver determines if the response indicates that the host computer process that issued the received command is associated a process-related identifier on the allowed list and is associated with an authorized identifier. In response to determining that the response from the supplemental process indicates that the host computer process that issued the received command is not associated with a process-related identifier on the allowed list, at a step 609*l*, high-level driver 407 may add a process identifier associated with the host computer process as an unauthorized identifier to the blacklist. The blacklist may comprise unauthorized identifiers associated with host computer processes that are not authorized to alter the data stored on protected storage device 105 and are or have been active during the current runtime.

At a step 609*m*, high-level driver 407 may block the command from being communicated to the low-level driver or the protected storage device.

In response to determining in step 609*k* that the response received from the supplemental process indicates that the host computer process that issued the received command is associated with a process-related identifier on the allowed list and is associated with an authorized identifier, at a step 609*n*, high-level driver 407 adds the authorized identifier associated with the host computer process to the whitelist of the high-level driver. High-level driver 407 or the supplemental process may also notify low-level driver 409 that the authorized identifier associated with the host computer is additionally added to the whitelist. Preferably, the supplemental process notifies both the high-level driver and the low-level driver when an active process is determined to be on the allowed list and correspondingly should be added to the local whitelists of the drivers.

At a step 609*o*, high-level driver 407 allows the command to be communicated to low-level driver 409. To that end, the method of step 609 may continue with step 609*c*. In some other example embodiments, there is no high-level driver 407 and low-level driver 409 maintains a whitelist only, or a whitelist and a blacklist as described for driver 407. After low-level driver 409 determines that the host computer process that issued the received command is on the whitelist, low-level driver 409 communicates the command to protected storage device 105 to alter data stored on the protected storage device.

In this way, only an authorized host computer process that is currently active on host computer 101 may be allowed to alter data stored on protected storage device 105, by method 600 and the extended method of step 609. To that end, when an unauthorized host computer process, such as a malicious application, tries to alter data stored on protected storage device 105, the blocking driver assembly blocks the write command associated with the unauthorized host computer process, preventing unauthorized altering of the data. In some example embodiments, an error status may be sent to the unauthorized host computer process that indicates that protected storage device 105 is write protected for the unauthorized host computer process. Accordingly, the application of method 600 may mitigate a ransomware attack and avoid data corruption on the protected storage device.

Further, some additional steps that support method 600 are presented in FIGS. 7A and 7B. FIG. 7A is a flowchart illustrative of an exemplary method 700*a* for storing the allowed list of one or more process-related identifiers on at least one general storage device 101*a*, in accordance with one or more example embodiments. Method 700*a* may be used in conjunction with system 400 described with reference to FIGS. 4A and 4B, as well as the other systems previously described.

Starting at a step 701*a*, method 700*a* may include the supplemental process accessing authorization information identifying one or more authorized host computer process authorized to alter data stored on protected storage device 105. The accessed authorization information may include, among other things, information associated with each authorized process, such as a file name, a file location, a user, and/or a publisher's digital signature.

At a step 703*a*, the supplemental process may generate from the accessed authorization information, the allowed list of one or more process-related identifier. Each of the one or more process-related identifier of the allowed list is associated with one of the identified authorized host computer processes. At a step 705*a*, the supplemental process stores the allowed list of process-related identifiers and associated authorized host computer processes on at least one general storage device 101*a*.

FIG. 7B is a flowchart illustrative of an exemplary method 700*b* for storing the whitelist of each of the one or more authorized identifier on a general storage device 101*a*. Method 700*b* may be used in conjunction with system 400 described in the detail description of FIGS. 4A and 4B, as well as the other systems described.

Starting at a step 701*b*, the supplemental process may store on at least one general storage device 101*a* whitelist of each of the one or more authorized identifier for which the associated one or more authorized host computer process is currently active. In various embodiments, if an authorized host computer process is associated with the process-related identifier on the allowed list and if the authorized host computer process is currently active, then an authorized identifier associated with the authorized host computer process is added to the whitelist.

For example, if an authorized host computer process is associated with the process-related identifier on the allowed list and if the authorized host computer process is currently active, then a number associated with the process-related identifier associated with the authorized host computer process may be added as an authorized identifier to the whitelist. The number associated with the process-related identifier may be a number assigned by Windows to refer to the corresponding process-related identifier. To that end, the whitelist is typically a subset of the allowed list. Further, the whitelist may be a dynamic list in that it may vary with time as the one or more authorized host computer processes change between active and inactive states.

At a step 703b, the supplemental process monitors each of the authorized host computer processes that is currently active, and are correspondingly on the whitelist.

At a step 705b, the supplemental process removes an authorized identifier from the whitelist when the associated host computer process becomes inactive. In some example embodiments, the supplemental process also notifies the high-level driver and low-level driver when an authorized identifier is added to or removed from the whitelist of the supplemental process so whitelists of the drivers are changed accordingly. Thus, the three whitelists in this example are maintained to be the same.

In this way, the supplemental process may dynamically update the whitelist when authorized host computer processes become active or inactive. Further, once the supplemental process updates the whitelist, the supplemental process may notify high-level driver 407 and low-level driver 409 of the update to the whitelist. For example, when an authorized host computer process included on the allowed list becomes active, then the supplemental process adds the authorized identifier associated with the authorized host computer process to the whitelist of the supplemental process. The supplemental process then notifies high-level driver 407 and low-level driver 409 that the authorized identifier associated with the authorized host computer process is added to the whitelist. Then, when the authorized host computer process becomes inactive, the supplemental process removes the authorized identifier associated with the authorized host computer process from the whitelist; and notifies high-level driver 407 and low-level driver 409 that the authorized identifier associated with the authorized host computer process is removed from the whitelist.

The supplemental process may perform additional functions as well. For example, the supplement process may send to connection interface device 103 an instruction to disconnect protected storage device 105 from host processor 101b, in response to determining that no authorized identifiers are on the whitelist. The supplemental process may also communicate with the connection interface device before the connection interface device 103 establishes communication between protected storage device 105 and host processor 101b. The supplement process may monitor high-level driver 407 and low-level driver 409, and send an instruction to connection interface device 103 to disconnect communication between protected storage device 105 and host processor 101b when either one of high-level driver 407 and low-level driver 409 ceases to be active.

As an additional example, the supplemental process may store on a general storage device an indication of an authorized identifier for which each of an associated plurality of authorized host computer processes are currently active, such as on the whitelist. The activity of each of the associated plurality of authorized host computer processes are monitored. When at least one of the associated plurality of authorized host computer processes becomes inactive, the stored indication of the authorized identifier is removed (deleted from the whitelist).

Thus, using combinations of the methods and techniques described with reference to FIGS. 6A, 6B-1, 6b-2, 7A, and -7B, a combination default write blocking system configured as system 100a, 100b, 200, 300, 400, or 500 may provide process-based conditional authorization for allowing writes to protected storage device 105, by various processes of the host processor 101b, which is operatively connected to the protected storage device 105 through the connection interface device 103. The process-based authorization provided by combination default write-blocking systems disclosed herein may in turn provide flexibility, security, and data integrity.

Many modifications and other embodiments of the systems and methods set forth herein will come to mind to one skilled in the art to which these systems and methods pertain having the benefit of the teachings presented in the foregoing descriptions and the associated drawings. Therefore, it is to be understood that inventions disclosed herein are not to be limited to the specific embodiments disclosed and that modifications and other embodiments are intended to be included within the scope of the appended claims. Moreover, although the foregoing descriptions and the associated drawings describe examples of combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be encompassed in the appended claims. Although specific terms are employed herein, they are used in describing the disclosed examples and are not for purposes of limitation.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and sub-combinations of the various elements, features, functions, and/or properties disclosed herein. The following claims particularly point out certain combinations and sub-combinations regarded as novel and nonobvious. Inventions embodied in other combinations and sub-combinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the disclosed subject matter.

What is claimed is:

1. A combination default write-blocking system comprising:
   a host computer including:
      at least one general storage device configured to store program instructions for a blocking driver assembly; and
      a host processor operatively coupled to the at least one general storage device and configured as the blocking driver assembly while executing the program instructions for the blocking driver assembly; and
   a connection interface device physically separate from the host processor and configured to be operatively coupled to the host processor and to a protected storage device physically separate from the at least one general storage device, receive a communication from the blocking driver assembly, and establish communication between the protected storage device and the host processor after receiving the communication from the blocking driver assembly; and wherein the blocking driver assembly is further configured to communicate with the connection interface device and conditionally allow a host computer process to alter data stored on the protected storage device.

2. The combination default write-blocking system of claim 1, wherein the at least one general storage device is further configured to store at least one authorized identifier associated with at least one authorized host computer process authorized to alter data stored on the protected storage device, and the blocking driver assembly is further configured to allow the at least one authorized host computer process to alter data stored on the protected storage device based on the at least one authorized identifier, and prevent a host computer process not associated with an authorized identifier, including the at least one authorized identifier, from altering data stored on the connected protected storage device.

3. The combination default write-blocking system of claim 2, wherein:
   the blocking driver assembly includes a high-level driver and a low-level driver,
   the high-level driver is configured to associate a command with a host computer process that issued the command and further to determine if the associated host computer process is associated with the authorized identifier, and
   the low-level driver is configured to establish communication with the connection interface device before the connection interface device establishes communication between the protected storage device and the host processor, and communicate the command with the protected storage device when the associated host computer process is associated with the at least one authorized identifier.

4. The combination default write-blocking system of claim 3, wherein the high-level driver is further configured to add a tag to the command indicating whether the associated host computer process is associated with the authorized identifier, and the low-level driver is further configured to block or pass the command, based on the tag added to the command.

5. The combination default write-blocking system of claim 4, wherein the high-level driver is further configured to block the command if the associated host computer process is not associated with the authorized identifier and the command would alter data stored on the protected storage device.

6. The combination default write-blocking system of claim 4, wherein the low-level driver is further configured to allow the command having the tag indicating that the associated host computer process has the authorized identifier.

7. The combination default write-blocking system of claim 4, wherein the low-level driver is further configured to block the command not having the tag indicating that the associated host computer process is associated with the at least one authorized identifier.

8. The combination default write-blocking system of claim 3, wherein the high-level driver is further configured to block the command from being communicated to the low-level driver if the command is from a host computer process not associated with the at least one authorized identifier.

9. The combination default write-blocking system of claim 2, wherein the program instructions for the blocking driver assembly includes instructions for a supplemental process configured to:
   access authorization information identifying one or more authorized host computer process, including the at least one authorized host computer process, authorized to alter data stored on the protected storage device;
   generate, from the accessed authorization information, a first list of one or more process-related identifier, wherein each of the one or more process-related identifier is associated with one or more of the identified authorized host computer process; and
   store, on the at least one general storage device, the first list of the one or more process-related identifier and associated one or more of the identified authorized host computer process.

10. The combination default write-blocking system of claim 9, wherein the supplemental process is further configured to store, on the at least one general storage device, a second list of each of the one or more authorized identifier for which the associated one or more authorized host computer process is currently active.

11. The combination default write-blocking system of claim 10, wherein the supplemental process is further configured to:
    monitor each of the one or more authorized host computer process that is currently active; and
    remove from the second list the authorized identifier of the one or more authorized identifier when the associated one of the one or more associated authorized host computer process becomes inactive.

12. The combination default write-blocking system of claim 11, wherein the supplemental process is further configured to:
    determine when no authorized host computer process is active; and
    send to the connection interface device an instruction to disconnect the protected storage device when no authorized host computer process is active.

13. The combination default write-blocking system of claim 10, wherein the program instructions for the blocking driver assembly includes instructions for at least a first driver for driving the protected storage device, and the supplemental process is further configured to send to the first driver the second list, and the first driver is configured to determine if an associated host computer process that issued a command received by the first driver is associated with an authorized identifier on the second list.

14. The combination default write-blocking system of claim 13, wherein the first driver is configured, when the first driver determines the associated host computer process that issued the command is not associated with an authorized identifier on the second list, to:
    send a communication to the supplemental process inquiring as to whether the associated host computer process that issued the received command is an authorized host computer process;
    receive a response from the supplemental process indicating whether or not the associated host computer process that issued the received command is associated with a process-related identifier on the first list and has an associated authorized identifier; and
    add the associated authorized identifier to the second list if the associated host computer process that issued the received command is associated with a process-related identifier on the first list.

15. The combination default write-blocking system of claim 13, wherein, if the supplemental process notifies the first driver that the command is from a host computer process that is not associated with a process-related identifier on the first list, the first driver adds an unauthorized identifier to a third list of unauthorized identifiers associated with unauthorized host computer processes.

16. The combination default write-blocking system of claim 15, wherein, if the host computer process that issued the received command is not associated with an authorized identifier on the second list, and prior to sending the inquiry to the supplemental process asking if the host computer process that issued the received command is associated with a process-related identifier on the first list, the first driver determines if the host computer process that issued the received command is associated with an unauthorized identifier on the third list.

17. The combination default write-blocking system of claim 13, wherein the first driver is a high-level driver and the program instructions for the blocking driver assembly includes instructions for a low-level driver, the supplemental process is configured to send to the low-level driver the second list, and the low-level driver is configured to receive the second list from the supplemental process.

18. The combination default write-blocking system of claim 17, wherein the low-level driver is configured to receive a command issued by a host computer process, and determine if the host computer process that issued the received command is associated with an authorized identifier on the second list.

19. The combination default write-blocking system of claim 9, wherein the supplemental process is further configured to communicate with the connection interface device; and the connection interface device is configured to communicate with the supplemental process, and establish communication between the protected storage device and the host computer only after communication with both the blocking driver assembly and the supplemental process.

20. The combination default write-blocking system of claim 9, wherein the at least one general storage device is further configured to store an authorized identifier associated with an associated plurality of authorized host computer processes authorized to alter data stored on the protected storage device, including the at least one authorized host computer process, and the blocking driver assembly is further configured to block each of the associated plurality of authorized host computer processes from altering data stored on the connected protected storage device when at least one of the associated plurality of authorized host computer processes is inactive.

21. The combination default write-blocking system of claim 20, wherein the supplemental process is further configured to:
store on the at least one general storage device an indication of the authorized identifier for which each of the associated plurality of authorized host computer processes are currently active;
monitor the associated plurality of authorized host computer processes; and
remove the indication of the authorized identifier when at least one of the associated plurality of authorized host computer processes becomes inactive.

22. The combination default write-blocking system of claim 3, wherein the at least one general storage device is further configured to store instructions for a supplemental process configured to:
monitor the high-level driver and the low-level driver; and
send to the connection interface device an instruction to disconnect the protected storage device when either one of the high-level driver and the low-level driver ceases to be active.

23. The combination default write-blocking system of claim 2, wherein the at least one general storage device is further configured to store an authorized identifier for each of an associated plurality of authorized host computer processes authorized to alter data stored on the protected storage device, including the authorized host computer process, and the blocking driver assembly is further configured to block each of the associated plurality of authorized host computer processes from altering data stored on the connected protected storage device when at least one of the associated plurality of authorized host computer processes becomes inactive.

24. The combination default write-blocking system of claim 23, wherein the at least one general storage device is configured to store instructions for a supplemental process configured to:
store, on the at least one general storage device when the associated plurality of authorized host computer processes is currently active on the host computer, an indication that the associated plurality of authorized host computer processes associated with the authorized identifier are currently active;
monitor an activity of each of the associated plurality of authorized host computer processes; and
remove the indication when at least one of the associated plurality of authorized host computer processes becomes inactive.

25. The combination default write-blocking system of claim 2, wherein:
the blocking driver assembly is further configured to monitor an activity of each of the at least one authorized host computer process, and send to the connection interface device an instruction to connect the protected storage device to the host computer when at least one authorized host computer process becomes active; and
the connection interface device is further configured to connect the protected storage device to the host processor only after the connection interface device receives the instruction from the blocking driver assembly to connect the protected storage device to the host processor when at least one authorized host computer process becomes active.

* * * * *